(12) United States Patent
Mizoguchi et al.

(10) Patent No.: US 6,191,873 B1
(45) Date of Patent: Feb. 20, 2001

(54) IMAGE READING DEVICE, IMAGE READING APPARATUS, AND METHOD THEREFOR

(75) Inventors: Shigeru Mizoguchi, Kawasaki; Koji Fukunaga, Tokyo; Kenji Maeda, Yokohama; Kiyoshi Katano, Chiba; Takahiro Onsen; Makoto Kobayashi, both of Yokohama; Jin Sunata, Kawasaki, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/975,848

(22) Filed: Nov. 21, 1997

(30) Foreign Application Priority Data

| Nov. 25, 1996 | (JP) | 8-313712 |
| Dec. 24, 1996 | (JP) | 8-343554 |
| Dec. 24, 1996 | (JP) | 8-343555 |
| Dec. 24, 1996 | (JP) | 8-343556 |

(51) Int. Cl.[7] .................................................. H04N 1/40
(52) U.S. Cl. ...................................... 358/516; 358/461
(58) Field of Search ................................ 358/515–523, 358/461

(56) References Cited

U.S. PATENT DOCUMENTS

| 4,963,978 | * | 10/1990 | Ueda et al. | 358/29 |
| 5,016,093 | * | 5/1991 | Yoshida | 358/41 |
| 5,386,229 | * | 1/1995 | Suzuki | 348/227 |

* cited by examiner

Primary Examiner—Thomas D. Lee
Assistant Examiner—Stephen Brinich
(74) Attorney, Agent, or Firm—Morgan & Finnegan LLP

(57) ABSTRACT

To provide an image reading device capable of reading a high-quality image under the conditions such as compactness, simplification, and low power consumption, an image reading apparatus using this image reading device, and a method therefor, white reference data for white level correction is stored in a memory in correspondence with a reference temperature. A temperature near the image reading device is detected, and white reference data is corrected on the basis of the temperature difference between the detected temperature and the reference temperature. The corrected white reference data is used in white level correction of an image signal output from a CCD included in the image reading device.

37 Claims, 34 Drawing Sheets

FIG. 12A
COLOR MODE

| RESOLUTION | ACCUMU-LATION TIME | FORWARD msec | BACKWARD msec | ONE-LINE TIME msec | DOT WIDTH | NUMBER OF TIMES | A4 TIME msec |
|---|---|---|---|---|---|---|---|
| 360 × 360 dpi ∅TR = 0 COLOR | 256μsec | 3.9K | 3.9K | | 64 | | |
| | | 863.4 | 863.4 | 1726.8 | | 66 | 341906.4 |
| | | | | | | | 5'42" |
| 180 × 180 dpi ∅TR = 0 COLOR | 320μsec | 6.25K | 6.25K | | 64 | | |
| | | 545.4 | 545.4 | 1090.8 | | 66 | 215978.4 |
| | | | | | | | 3'36" |
| 90 × 90 dpi ∅TR = 0 COLOR | 307μsec | 6.51K | 6.51K | | 64 | | |
| | | 523.6 | 523.6 | 1047.2 | | 66 | 207345.6 |
| | | | | | | | 3'27" |
| 200 × 360 dpi ∅TR = 0 COLOR | 288μsec | 6.25K | 6.25K | | 64 | | |
| | | 545.4 | 545.4 | 1090.8 | | 66 | 215978.4 |
| | | | | | | | 3'36" |
| 300 × 360 dpi ∅TR = 0 COLOR | 307μsec | 3.9K | 3.9K | | 64 | | |
| | | 863.4 | 863.4 | 1726.8 | | 66 | 341906.4 |
| | | | | | | | 5'42" |

PAPER FEED TIME : 5 SEC          SCAN AREA
DELIVERY TIME : 1 SEC            HORIZONTAL : 203mm ( 8 inch )
                                 VERTICAL : 297mm ( 11.7 inch )

FIG. 12B
MONOCHROME MULTIVALUE MODE

| RESOLUTION | ACCUMU-LATION TIME | FORWARD msec | BACKWARD msec | ONE-LINE TIME msec | DOT WIDTH | NUMBER OF TIMES | A4 TIME msec |
|---|---|---|---|---|---|---|---|
| 360 × 360 dpi ∅TR = 0 MONO | 256μsec | 3.9K | 3.9K | | 64 | | |
| | | 863.4 | 863.4 | 1726.8 | | 66 | 113968.8 |
| | | | | | | | 1'54" |
| 180 × 180 dpi ∅TR = 0 MONO | 320μsec | 6.25K | 6.25K | | 64 | | |
| | | 545.4 | 545.4 | 1090.8 | | 66 | 71992.8 |
| | | | | | | | 1'12" |
| 90 × 90 dpi ∅TR = 0 MONO | 307μsec | 6.51K | 6.51K | | 64 | | |
| | | 523.6 | 523.6 | 1047.2 | | 66 | 69115.2 |
| | | | | | | | 1'09" |
| 200 × 360 dpi ∅TR = 0 MONO | 288μsec | 6.25K | 6.25K | | 64 | | |
| | | 545.4 | 545.4 | 1090.8 | | 66 | 71992.8 |
| | | | | | | | 1'12" |
| 300 × 360 dpi ∅TR = 0 MONO | 307μsec | 3.9K | 3.9K | | 64 | | |
| | | 863.4 | 863.4 | 1726.8 | | 66 | 113968.8 |
| | | | | | | | 1'54" |

PAPER FEED TIME : 5 SEC          SCAN AREA
DELIVERY TIME : 1 SEC            HORIZONTAL : 203mm ( 8 inch )
                                 VERTICAL : 297mm ( 11.7 inch )

FIG. 12C
MONOCHROME BINARY MODE

| RESOLUTION | ACCUMULATION TIME | FORWARD msec | BACKWARD msec | ONE-LINE TIME msec | DOT WIDTH | NUMBER OF TIMES | A4 TIME msec |
|---|---|---|---|---|---|---|---|
| 360 × 360 dpi | 256μsec | 3.9K | 3.9K | | 64 | | |
| ØTR = 0 MONO | | 863.4 | 863.4 | 1726.8 | | 66 | 113968.8 |
| | | | | | | | 1'54" |
| 180 × 180 dpi | 320μsec | 6.25K | 6.25K | | 64 | | |
| ØTR = 0 MONO | | 545.4 | 545.4 | 1090.8 | | 66 | 71992.8 |
| | | | | | | | 1'12" |
| 90 × 90 dpi | 307μsec | 6.51K | 6.51K | | 64 | | |
| ØTR = 0 MONO | | 523.6 | 523.6 | 1047.2 | | 66 | 69115.2 |
| | | | | | | | 1'09" |
| 200 × 360 dpi | 288μsec | 6.25K | 6.25K | | 64 | | |
| ØTR = 0 MONO | | 545.4 | 545.4 | 1090.8 | | 66 | 71992.8 |
| | | | | | | | 1'12" |
| 300 × 360 dpi | 307μsec | 3.9K | 3.9K | | 64 | | |
| ØTR = 0 MONO | | 863.4 | 863.4 | 1726.8 | | 66 | 113968.8 |
| | | | | | | | 1'54" |

PAPER FEED TIME : 5 SEC
DELIVERY TIME : 1 SEC

SCAN AREA
HORIZONTAL : 203mm ( 8 inch )
VERTICAL : 297mm ( 11.7 inch )

FIG. 22A

| 0 | WHITE REFERENCE DATA OBTAINING COUNT |
|---|---|
| 1 | TEMPERATURE IN OBTAINING FIRST REFERENCE DATA |
| 2 | TEMPERATURE IN OBTAINING SECOND REFERENCE DATA |
| 3 | TEMPERATURE IN OBTAINING THIRD REFERENCE DATA |
| 4 | TEMPERATURE IN OBTAINING FOURTH REFERENCE DATA |
| 5 | TEMPERATURE IN OBTAINING FIFTH REFERENCE DATA |
| 6<br>...<br>15 | SUPPLEMENTARY AREA |

FIG. 22B

| FIRST WHITE REFERENCE DATA | | | | |
|---|---|---|---|---|
| TIME STAMP | | | | |
| WHITE REFERENCE DATA FOR ACCUMULATION TIME OF 256 μs | | | | |
| WHITE REFERENCE DATA FOR RED | | | | |
| WHITE DATA 1 | ... | | WHITE DATA 128 | |
| BLACK DATA 1 | ... | | BLACK DATA 128 | |
| GAIN | SUPPLEMENTARY | ID | TEMPERATURE | |
| WHITE REFERENCE DATA FOR GREEN | | | | |
| WHITE REFERENCE DATA FOR BLUE | | | | |
| WHITE REFERENCE DATA FOR ACCUMULATION TIME OF 320 μs | | | | |
| WHITE REFERENCE DATA FOR ACCUMULATION TIME OF 307 μs | | | | |
| WHITE REFERENCE DATA FOR ACCUMULATION TIME OF 288 μs | | | | |
| WHITE REFERENCE DATA FOR ACCUMULATION TIME OF 307 μs | | | | |
| SECOND WHITE REFERENCE DATA | | | | |
| THIRD WHITE REFERENCE DATA | | | | |
| FOURTH WHITE REFERENCE DATA | | | | |
| FIFTH WHITE REFERENCE DATA | | | | |

FIG. 23

| COMMAND PARAMETER | COMMAND CONTENTS |
|---|---|
| 1000H | PORT INITIALIZATION |
| 3000H ~ | LEFT OFFSET VALUE DESIGNATION |
| 4000H | PRINT IMAGE TRANSFER |
| 8000H ~ | SCANNER READING COMMAND |
| 9000H ~ | FEED |
| 9FF0H | DELIVERY |
| 9FF1H | PAPER FEED |
| A700H | OPERATION FOR OBTAINING CURRENT HEAD TEMPERATURE AND TEMPERATURE IN APPARATUS |
| A801H | OPERATION FOR OBTAINING MOUNTED HEAD INFORMATION |
| A809H | OPERATION FOR OBTAINING MOUNTED HEAD ID |
| AD00H ~ AD7FH | OPERATION FOR OBTAINING WHITE REFERENCE DATA FOR EACH DOT |
| AD80H | OPERATION FOR OBTAINING HEAD ID IN OBTAINING WHITE REFERENCE DATA |
| AD81H | OPERATION FOR OBTAINING TEMPERATURE IN OBTAINING WHITE REFERENCE DATA |
| ADE0H ~ ADE4H | ACCUMULATION TIME DESIGNATION |
| ADF0H | WHITE REFERENCE DATA OBTAINING DESIGNATION |
| ADF1H ~ ADF3H | R, G, AND B DESIGNATION |
| ADF8H | WHITE REFERENCE DATA DESIGNATION |
| ADF9H | OFFSET DESIGNATION |
| ADFAH | GAIN DESIGNATION |
| ADFBH | SUPPLEMENTARY |
| BD00H ~ BD7FH | WHITE REFERENCE DATA SETTING FOR EACH DOT |
| BD80H | HEAD ID SETTING |
| BD81H | TEMPERATURE SETTING |
| BDE0H ~ BDE4H | ACCUMULATION TIME SETTING |
| BDF0H | MONOCHROME DESIGNATION |
| BDF1H ~ BDF3H | R, G, AND B DESIGNATION |
| BDF8H | WHITE REFERENCE DATA DESIGNATION |
| BDF9H | OFFSET DESIGNATION |
| BDFAH | GAIN DESIGNATION |
| BDFBH | SUPPLEMENTARY |
| D000H | START OF HEAD EXCHANGE |
| D100H | END OF HEAD EXCHANGE |

FIG. 24

| | | | | |
|---|---|---|---|---|
| ADF0h GET DUMMY | | | | WHITE REFERENCE DATA OBTAINING DESIGNATION |
| ADE0h GET DUMMY | .... | ADE4h GET DUMMY | | ACCUMULATION TIME DESIGNATION |
| ADF1h GET DUMMY | .... ADF3h GET DUMMY | ADF1h GET DUMMY | .... ADF3h GET DUMMY | COLOR DESIGNATION |
| ADF8h GET DUMMY | ADF8h GET DUMMY | ADF8h GET DUMMY | ADF8h GET DUMMY | WHITE REFERENCE DATA DESIGNATION |
| AD00h DATA GET | AD00h DATA GET | AD00h DATA GET | AD00h DATA GET | W1 OBTAINING OPERATION |
| AD7Fh DATA GET | AD7Fh DATA GET | AD7Fh DATA GET | AD7Fh DATA GET | W128 OBTAINING OPERATION |
| ADF9h GET DUMMY | ADF9h GET DUMMY | ADF9h GET DUMMY | ADF9h GET DUMMY | OFFSET DESIGNATION |
| AD00h DATA GET | AD00h DATA GET | AD00h DATA GET | AD00h DATA GET | W1 OBTAINING OPERATION |
| AD7Fh DATA GET | AD7Fh DATA GET | AD7Fh DATA GET | AD7Fh DATA GET | W128 OBTAINING OPERATION |
| ADFAh GET DUMMY | ADFAh GET DUMMY | ADFAh GET DUMMY | ADFAh GET DUMMY | GAIN DESIGNATION |
| AD00h DATA GET | AD00h DATA GET | AD00h DATA GET | AD00h DATA GET | W1 OBTAINING OPERATION |
| ADF8h GET DUMMY | ADF8h GET DUMMY | ADF8h GET DUMMY | ADF8h GET DUMMY | |
| AD00h DATA GET | AD00h DATA GET | AD00h DATA GET | AD00h DATA GET | |
| AD80h DATA GET | AD80h DATA GET | AD80h DATA GET | AD80h DATA GET | HEAD ID OBTAINING OPERATION |
| AD81h DATA GET | .... AD81h DATA GET | AD81h DATA GET | .... AD81h DATA GET | TEMPERATURE OBTAINING OPERATION |

FIG. 25

| | | | | |
|---|---|---|---|---|
| BDE0h DUMMY SET | .... | BDE4h DUMMY SET | | ACCUMULATION TIME SETTING |
| BDF8h DUMMY SET | BDF8h DUMMY SET | BDF8h DUMMY SET | BDF8h DUMMY SET | WHITE REFERENCE DATA DESIGNATION |
| BD00h DATA SET | BD00h DATA SET | BD00h DATA SET | BD00h DATA SET | W1 SETTING OPERATION |
| BD7Fh DATA SET | BD7Fh DATA SET | BD7Fh DATA SET | BD7Fh DATA SET | W128 SETTING OPERATION |
| BDF9h DUMMY SET | BDF9h DUMMY SET | BDF9h DUMMY SET | BDF9h DUMMY SET | OFFSET DESIGNATION |
| BD00h DATA SET | BD00h DATA SET | BD00h DATA SET | BD00h DATA SET | W1 SETTING OPERATION |
| BD7Fh DATA SET | BD7Fh DATA SET | BD7Fh DATA SET | BD7Fh DATA SET | W128 SETTING OPERATION |
| BDFAh DUMMY SET | BDFAh DUMMY SET | BDFAh DUMMY SET | BDFAh DUMMY SET | GAIN DESIGNATION |
| BD00h DATA SET | BD00h DATA SET | BD00h DATA SET | BD00h DATA SET | W1 SETTING OPERATION |
| BDFBh DUMMY SET | BDFBh DUMMY SET | BDFBh DUMMY SET | BDFBh DUMMY SET | |
| BD00h DATA SET | BD00h DATA SET | BD00h DATA SET | BD00h DATA SET | |
| BD80h DATA SET | BD80h DATA SET | BD80h DATA SET | BD80h DATA SET | HEAD ID SETTING OPERATION |
| BD81h DATA SET | BD81h DATA SET | BD81h DATA SET | BD81h DATA SET | TEMPERATURE SETTING OPERATION |
| BDF1h .... DUMMY SET | BDF3h DUMMY SET | BDF1h .... DUMMY SET | BDF3h DUMMY SET | COLOR DESIGNATION |

F I G. 30
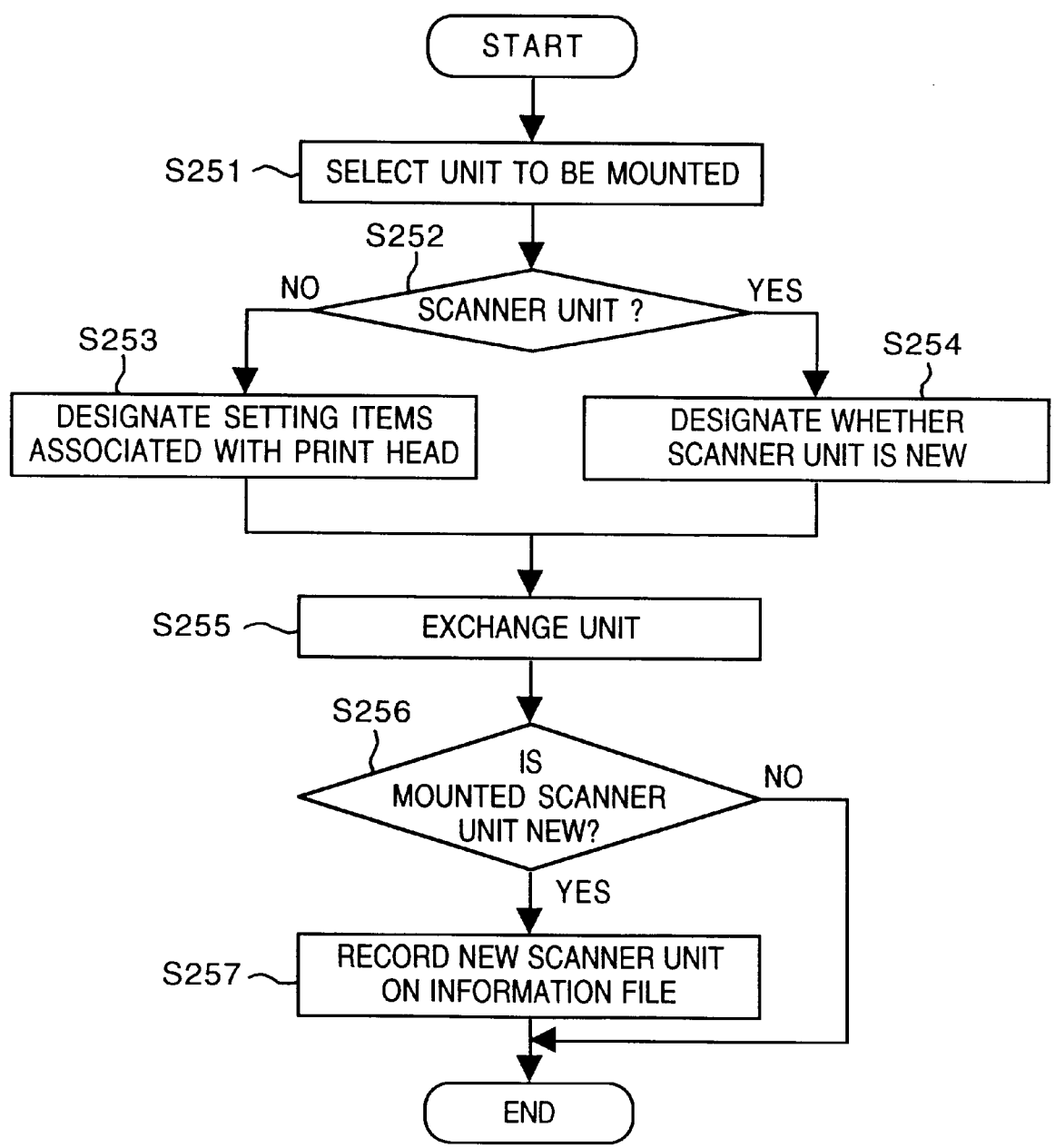

IMAGE READING DEVICE, IMAGE READING APPARATUS, AND METHOD THEREFOR

BACKGROUND OF THE INVENTION

1. Field of the Invention

The present invention relates to an image reading device, an image reading apparatus, and a method therefor and, more particularly, to an image reading device used in an image scanner or facsimile apparatus for reading light from an original, an image reading apparatus, and a method therefor.

2. Description of Related Art

As an image reading apparatus used in an image scanner or facsimile apparatus, an apparatus using a reduction optical system shown in FIG. 21 is known. Referring to FIG. 21, light is irradiated from a light source 5 to an original 6. The light reflected by the original 6 is deflected through 90° by a mirror 4 and focused on a CCD image sensor 1 through a lens 2, thereby converting the light into an image signal. A correction plate (shading correction plate) 3 for correcting a power of cos4 of a white output waveform lens. The image signal output from the CCD image sensor 1 is A/D-converted into digital data by an analog-to-digital (A/D) converter incorporated in an IC (not shown). The digital data is subjected to an image process. An inexpensive xenon (Xe) lamp or LED is often used as a light source for this image reading apparatus.

A printer serving as an image reading apparatus is available in which a scanner unit is mounted in place of a print head unit including an ink tank detachably mounted in the printer.

The above techniques pose the following problems. Since the absolute light amount of the Xe lamp or LED used in the image reading apparatus is small, a charge accumulation time (to be simply referred to also as an accumulation time hereinafter) in reading operation in the CCD image sensor 1 must be prolonged, and the sensitivity of a reception system must be improved in order to obtain stable image information. The sensitivity characteristics of the light-receiving portion for photoelectrically converting light reflected by the original have limitations although high-speed driving of a CCD device serving as a light-receiving element has advanced. In order to obtain a sufficiently high S/N ratio, the original must be illuminated in a sufficiently large light amount.

For this purpose, to increase the light amount by increasing a drive current to the LED, the drive current changes due to the wavelength of emission light upon heating of the LED itself and a change in forward voltage. As a result, a stable emission intensity cannot be obtained.

In a printer incorporated in a notebook personal computer, when a scanner unit is mounted in place of a print head unit, the scanner unit must be made compact and simple because the printer of this personal computer is compact. In addition, a reduction in power consumption is desired in consideration of driving the notebook personal computer using a secondary battery.

To correctly set the dynamic range in reading an image, a white reference value and an offset value must be measured for each scanner unit because the respective scanner units vary in characteristics. However, in mounting a scanner unit in the built-in printer of the notebook personal computer, white reference setting for setting the white reference value and the offset value is often omitted due to downsizing and low cost. In this case, every time the white reference value and the offset value are to be set, a user must feed originals for measuring the white reference value and the offset value to allow them to read these values, and must set the white reference value and the offset value.

SUMMARY OF THE INVENTION

The present invention has been made to solve the above problems, and has as its object to provide an image reading device capable of reading a high-quality image under the conditions as a compact, simple arrangement and low power consumption, an image reading apparatus using this image reading device, and a method therefor.

To achieve the above object, a preferred embodiment of the present invention discloses an image reading apparatus for reading an image of original, the apparatus comprising photoelectric conversion means for converting light from the original into an image signal, first correction means for correcting a white level of the image signal, storage means for storing white reference data for white level correction in correspondence with a reference temperature, detection means for detecting a temperature near the photoelectric conversion means, and second correction means for correcting the reference white data on the basis of a temperature difference between the temperature detected by the detection means and the reference temperature, wherein the white level is corrected by the first correction means using the white reference data corrected by the second correction means.

Also disclosed is an image reading device detachably attached to an image processing apparatus having storage means for storing white reference data for white level correction in correspondence with a reference temperature, detection means for detecting a temperature near the photoelectric conversion means, and first correction means for correcting the white reference data on the basis of a temperature difference between the temperature detected by the detection means and the reference temperature, the device comprising photoelectric conversion means for converting light from the original into an image signal, and second correction means for correcting a white level of the image signal, wherein the white level is corrected by the second correction means using the white reference data corrected by the first correction means.

It is another object of the present invention to provide an image reading device capable of preventing a read image from being degraded by causes such as a positional error in mounting a light source and the like under the conditions as the compact, simple arrangement and low power consumption, an image reading apparatus using this image reading device, and a method therefor.

To achieve the above object, a preferred embodiment of the present invention discloses an image reading apparatus for reading an image of original, the apparatus comprising photoelectric conversion means for converting light from the original into an image signal, amplification means for amplifying the image signal, detection means for detecting a peak level of an image signal corresponding to a pixel within an effective pixel range of the photoelectric conversion means and a peak level of an image signal corresponding to a pixel outside the effective pixel range on the basis of an image signal for a white reference obtained from the photoelectric conversion means, and setting means for comparing the peak levels detected by the detection means and setting an amplification factor of the amplification means on the basis of the comparison result.

It is still another object of the present invention to provide a reading unit capable of stably reading a high-quality image even if the reading unit is mounted in place of a print head unit, an image reading apparatus in which this reading unit is mounted, control of this image reading apparatus, and a control method therefor.

To achieve the above object, a preferred embodiment of the present invention discloses an image reading method for reading an image of original by using an image reading device having photoelectric conversion means for converting light from the original into an image signal and amplification means for amplifying the image signal, the method comprising the steps of detecting a peak level of an image signal corresponding to a pixel within an effective pixel range of the photoelectric conversion means and a peak level of an image signal corresponding to a pixel outside the effective pixel range on the basis of an image signal for a white reference obtained from the image reading device, comparing the detected peak levels, and setting an amplification factor of the amplification means on the basis of the comparison result.

It is still another object of the present invention to provide a reading unit capable of reading a high-quality image regardless of changes in reading mode and ambient temperature, an image reading apparatus in which this reading unit is mounted, and a control apparatus and method therefor.

To achieve the above object, a preferred embodiment of the present invention discloses an image reading method for an image processing apparatus having a carriage on which an image reading device for reading an image of original is detachably mounted, the method comprising the steps of obtaining identification information representing an image reading device mounted on the carriage, reading out white reference data corresponding to the identification information obtained in the obtaining step from storage means which stores white reference data representing a white reference from the image reading device in association with the identification information of the image reading device, and setting the readout white reference data in the image reading device mounted on the carriage.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 12A to 12C are tables showing reading modes of this embodiment;

FIGS. 22A and 22B are tables of a white reference database managed by a printer driver;

FIG. 23 is a table showing the interface commands of a notebook personal computer and a printer unit;

FIG. 24 is a view showing a command string issued from the notebook personal computer in obtaining white reference data;

FIG. 25 is a view showing a command string from the notebook personal computer in setting the white reference data;

FIG. 30 is a flow chart showing the exchange process for a scanner unit and a print head unit;

DESCRIPTION OF THE PREFERRED EMBODIMENTS

Preferred embodiments of an image reading device, an image reading apparatus, and a method therefor will be described in detail with reference to the accompanying drawings.

First Embodiment

Color Scanner Unit

Figure 1:
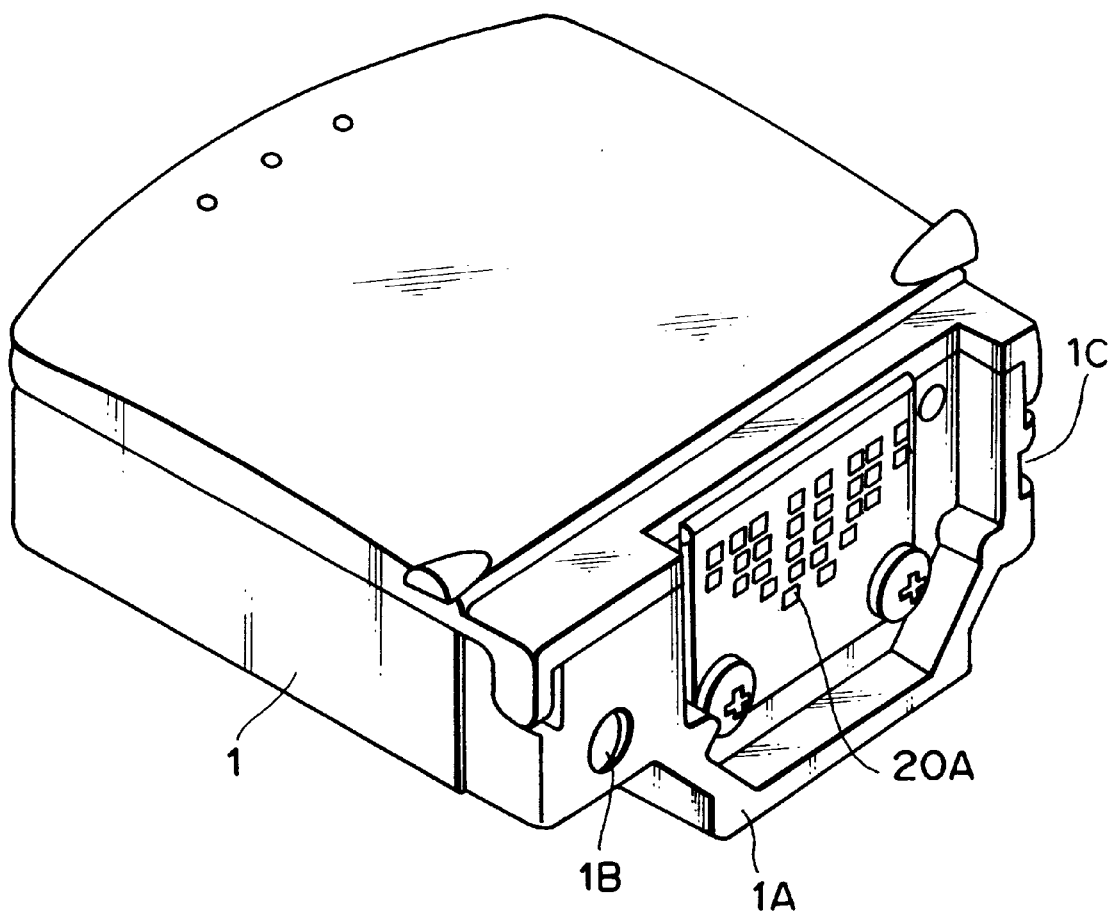
FIG. 1 is a perspective view showing a scanner unit to which the present invention is applied.

FIG. 1 is a perspective view showing the outer appearance of a color scanner unit (to be also referred to as a scanner unit hereinafter) serving as an image reading device to which the present invention is applied. When the scanner unit shown in FIG. 1 is mounted on the carriage of a printer unit, the read position of the scanner unit is determined by locating a reference wall 1 of the scanner unit in contact with a reference wall (not shown) on the carriage side. Projections (not shown) on the carriage side are engaged with a positioning hole 1B and a positioning groove 1C, thereby determining the mounting position. When the scanner unit is mounted on the printer unit, the scanner unit is electrically connected to the printer unit through a connector unit 20A serving as an interface (I/F) with the printer unit to exchange signals therebetween.

Figure 2:
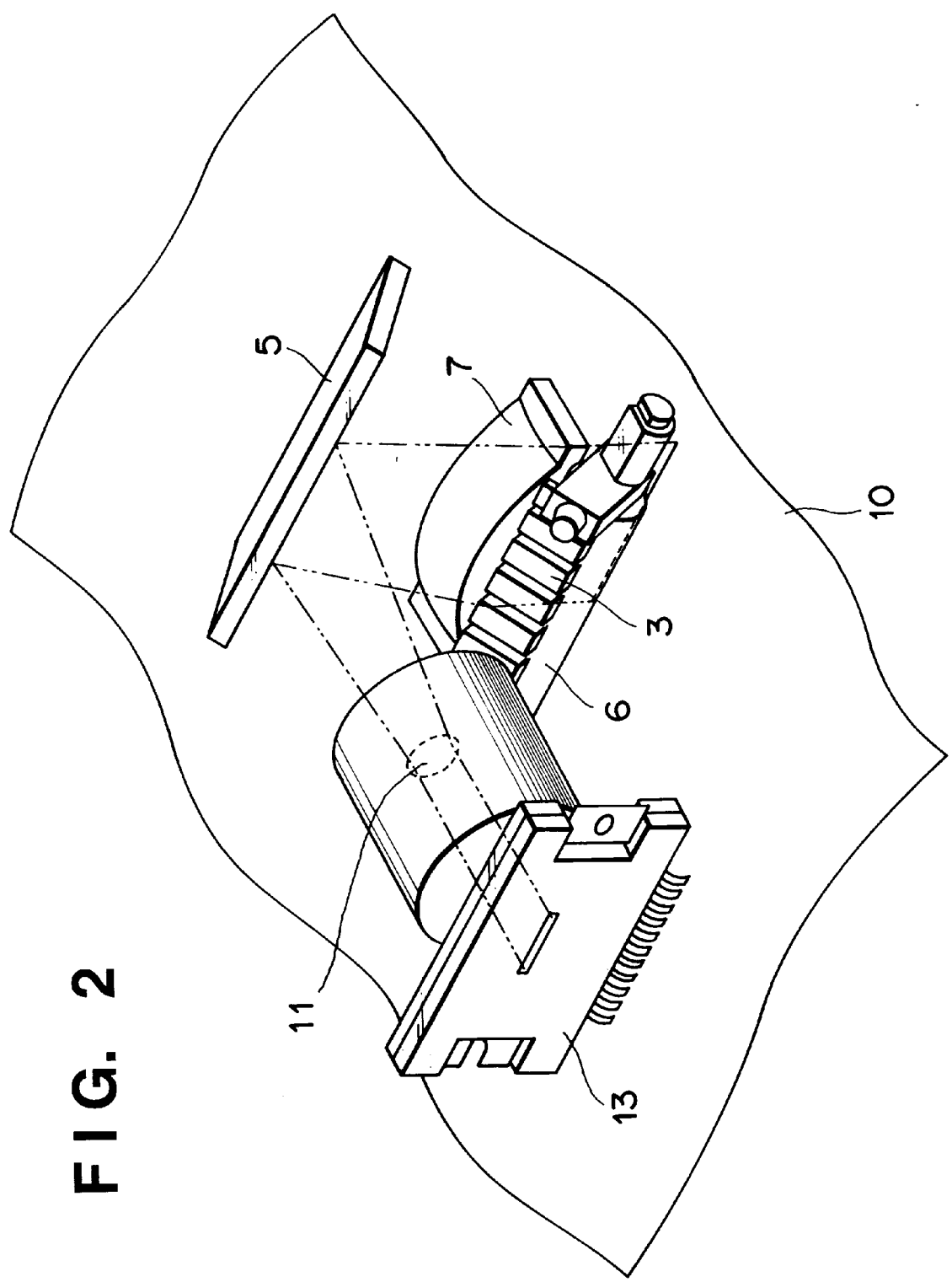
FIG. 2 is a perspective view showing the layout of optical components of the scanner unit shown in FIG. 1.

FIG. 2 is a view showing the layout of an optical system in the scanner unit shown in FIG. 1. Light emitted from an LED array (red wavelength 1=640 nm, green wavelength 1=525 nm, and blue wavelength 1=470 nm) in which three color LEDs serving as light sources are arrayed in the read width direction obliquely illuminates an original 10 through a cylindrical rod lens 6 disposed near the LED array 3 in a direction parallel to the array direction of the LED array 3.

Light reflected by the original 10 passes through a field lens 7 whose optical axis is perpendicular to the original surface. The light is then deflected through about 90° so as to make the light traveling direction almost parallel to the original surface. The deflected light is incident on an aperture 11. The aperture 11 is disposed on the image forming plane of the field lens 7. The reflected light temporarily focused by the aperture 11 is focused again by an image forming lens on the image-sensing surface of a light-receiving element 13 serving as a photoelectric conversion means. The reduction ratio of the image forming lens is 0.45158.

Figure 3:
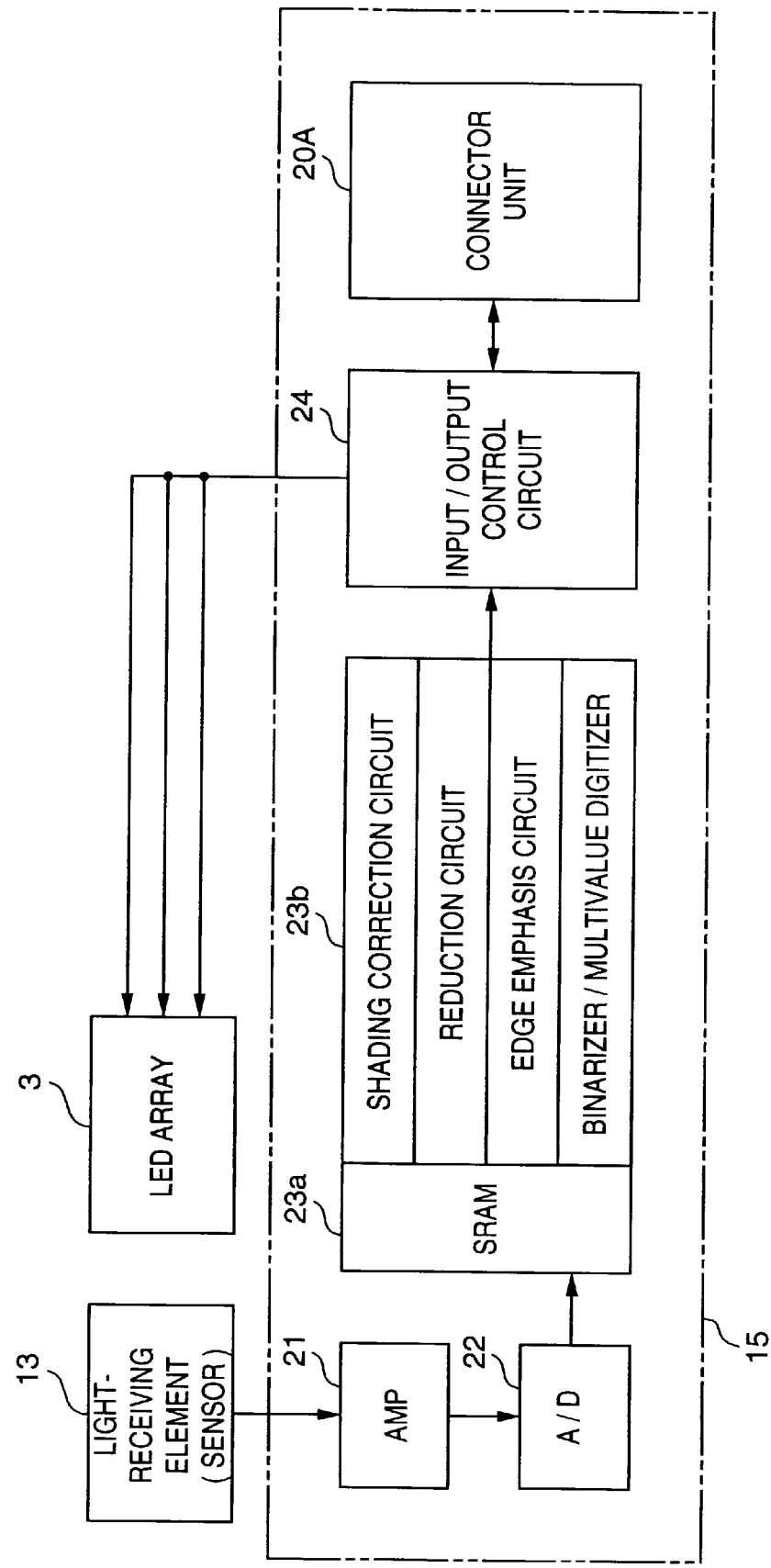
FIG. 3 is a block diagram showing the arrangement of the scanner unit shown in FIG. 1.

FIG. 3 is a block diagram showing the arrangement of the scanner unit. The light-receiving element (sensor) 13 comprises a monochrome CCD line sensor consisting of 128 pixels and reads a color image by switching the light sources for sequentially turning on the LEDs of the three colors, i.e., R, G, and B. In this embodiment, a total of five LEDs of the three colors, i.e., two R (red) LEDs, two G (green) LEDs, and one B (blue) LED are arranged. The number of LEDs and their layout are not limited to this, and any other arrangement may be employed.

Figure 4:
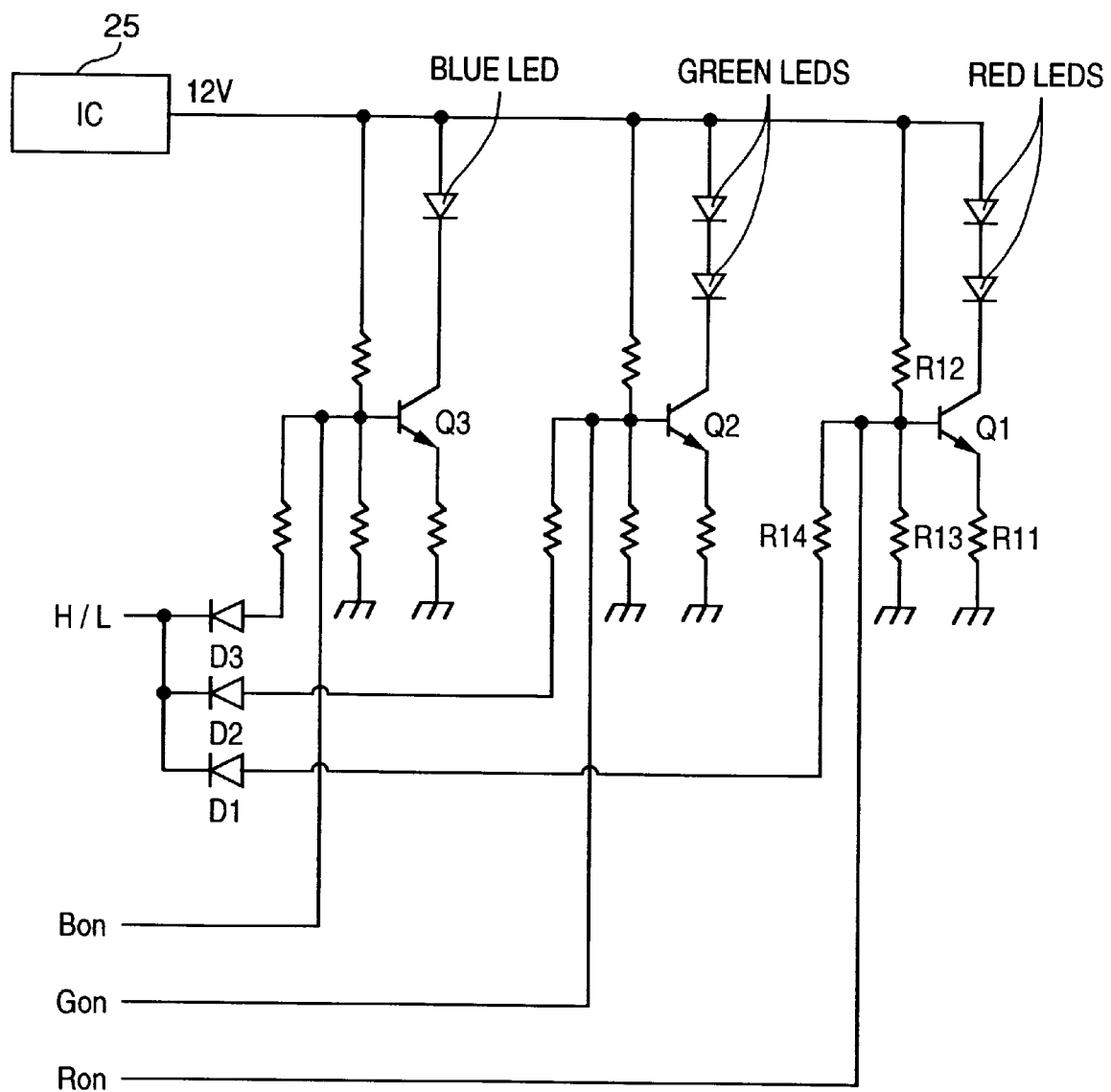
FIG. 4 is a circuit diagram showing a circuit for performing light source switching for an LED array shown in FIG. 3.

FIG. 4 is a block diagram showing a circuit for light source switching of the LED array 3. An IC 25 is a 3-terminal regulator for applying a voltage of 12 V to each LED. The LED drive circuit for each color constitutes a constant current circuit, and the arrangements of the LED drive circuits for the respective colors are identical to each other. Only the arrangement of the red LED drive circuit will be described below. When a signal Ron supplied to the base of a LED drive transistor Q1 is set at high level, the voltage of 12 V supplied from the IC 25 is divided by resistors R12 and R13, and the divided voltage is applied to the base of the transistor Q1. A drive current flows to the LED by a period until this divided voltage $V_B$ becomes equal to a sum $V_{BE}+V_{R11}$ of a base-emitter voltage $V_{BE}$ and a voltage drop $V_{R11}$ across the resistor R11, and the LED is turned on. When the signal Ron is set at low level, the transistor Q1 is turned off, and the LED is turned off accordingly. A signal H/L is a signal for switching the magnitude of the current flowing through the LED. When the signal H/L is set at low level, a resistor R14 is connected in parallel to the resistor R13 to lower the divided voltage $V_B$. The LED drive voltage is lowered by this decrease in the divided voltage $V_B$. A state in which the LED drive current is large is called "strong driving", while a state in which the LED drive current is small is called "weak driving".

The current value of each color LED will be described below. A drive current of 10 mA is supplied to the red and green LEDs when the signal Ron and a signal Gon are set at high level and the signal H/L is set at high level; and a current of 2.5 mA is supplied thereto when the signals Ron and Gon are set at high level and the signal H/L is set at low level. A drive current of 20 mA is supplied to the blue LED when a signal Bon is set at high level and the H/L signal is set at high level; a drive current of 5 mA is supplied thereto when the signal Bon is set at high level and the H/H level is set at low level. The set values of the drive current are changed depending on the types of LEDs to allow absorption of the differences in light amount levels reaching the original surface, which are caused by the number and layout of the LEDs.

A 3-path read operation using a sequential color scheme is performed to read a color image using the light-receiving element (sensor) 13 and the LED array 3. Of all the LEDs of the three colors, only the LED of the first color is turned on to obtain data of the first color component for one line corresponding to the read width of the light-receiving element 13 while moving the carriage. The LED of the second color is turned on without any line feed operation to obtain data of the second color component for the same line. Similarly, data of the third color component is also obtained from the LED of the third color to complete the read operation of the RGB color data for one line. The line feed operation is performed to start a read operation for the next line. The LED sequential turn-on operation is controlled by the CPU of a personal computer to be described later.

The arrangement of a part surrounded by the chain line in FIG. 3 constitutes a custom IC 15 prepared for the color scanner unit. The IC 15 comprises an amplifier (AMP) 21 for clamping a signal from the light-receiving element (sensor) 13 into a predetermined voltage and amplifying the peak level of the clamped signal to the optimal range of the A/D converter on the basis of a peak search result (to be described later), a 10-bit A/D converter (A/D) 22, an SRAM 23a, an image processor 23b (including a shading correction circuit, a column and line reduction circuit, an edge emphasis circuit, and a binarizer/multivalue digitizer), and an input/output control circuit 24 for exchanging signals with the printer unit. Note that the shading correction circuit performs white level correction of an image signal by means of printer firmware serving as the first correction means.

Notebook Personal Computer

The overall arrangement of a notebook personal computer having a printer unit on which the above color scanner unit is mounted will be described below with reference to FIGS. 5 and 6.

Figure 5:
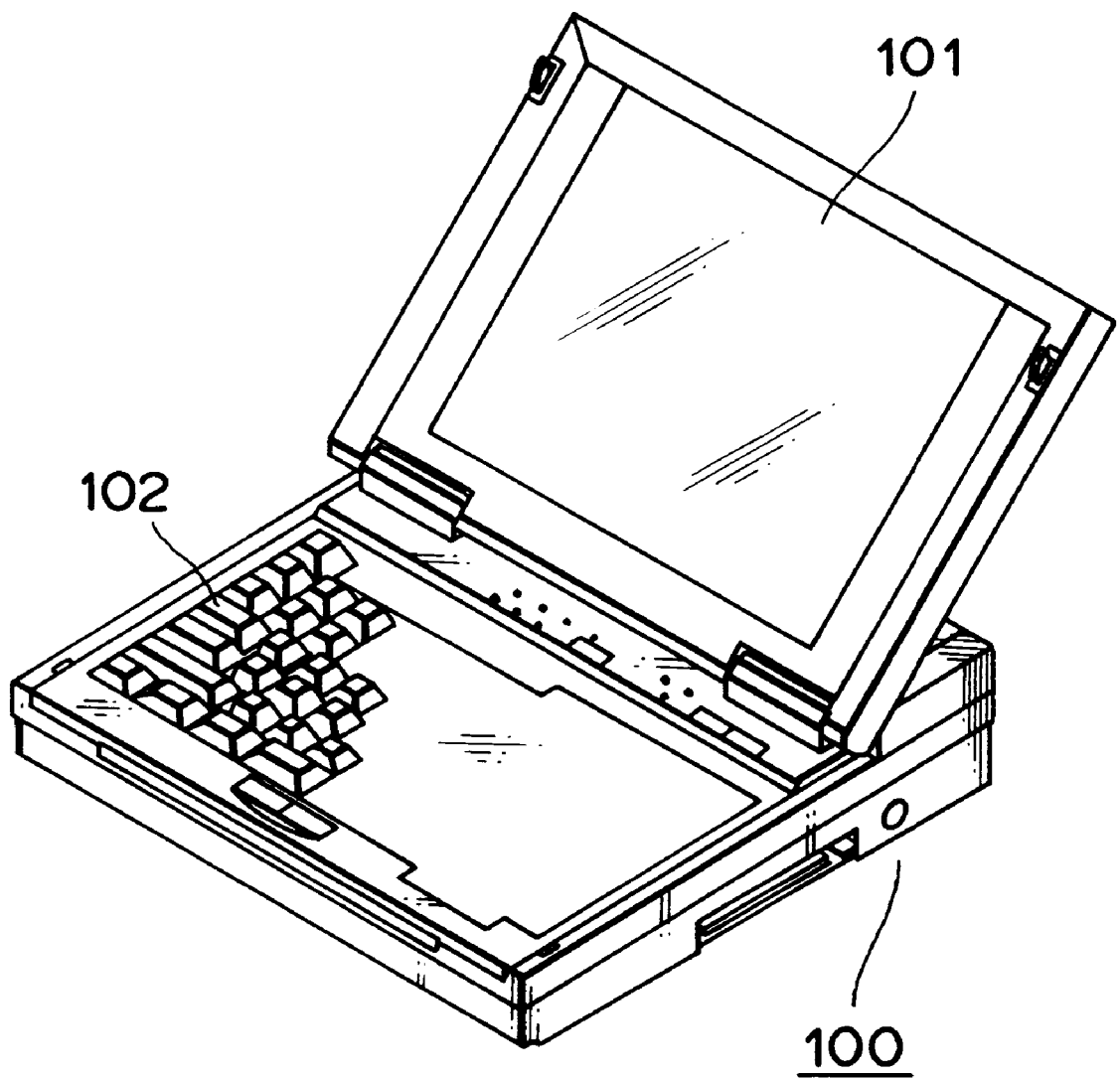
FIG. 5 is a perspective view of a notebook personal computer having a printer unit on which the scanner unit of this embodiment is mounted.

FIG. 5 is a perspective view showing the overall arrangement of a notebook personal computer 100 serving as a controller in the image reading apparatus of this embodiment. A liquid crystal display panel 101 is 11.8", Thin Film Transistor (TFT) type color liquid crystal display. The notebook personal computer 100 comprises a keyboard 102 which can be operated when the liquid crystal display panel 101 which can be laid down is opened, and a printer unit arranged at the rear of the keyboard 102.

Figure 6:
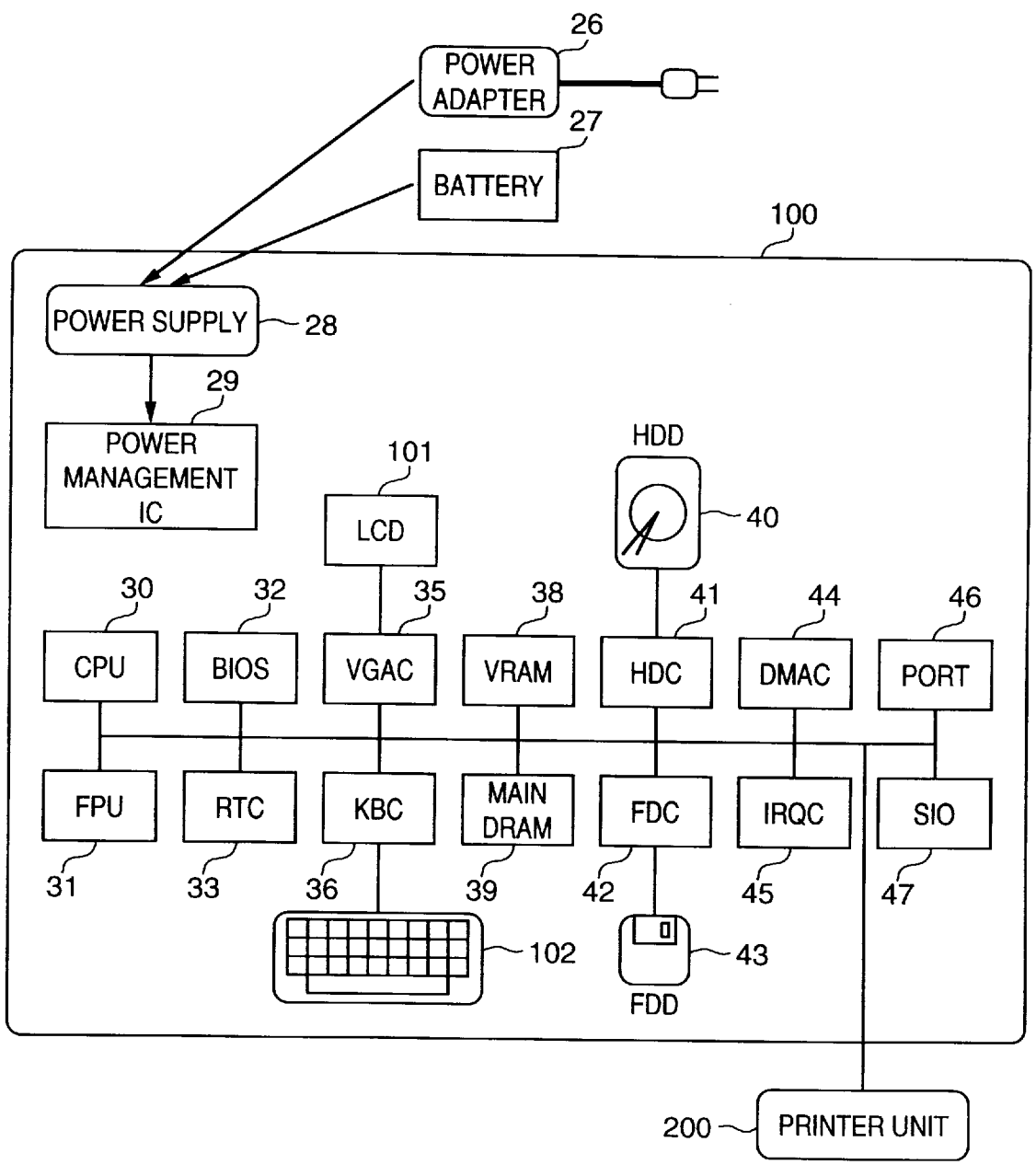
FIG. 6 is a block diagram showing the arrangement of the notebook personal computer.

FIG. 6 is a block diagram showing the arrangement of the notebook personal computer 100. This notebook personal computer 100 can use a power adapter 26 (rated output: 20 V, 54 W) and a secondary nickel-hydrogen secondary battery 27 (rated capacity: 12 V, 2,700 mAh) as power sources. The personal computer 100 incorporates peripheral unit controllers such as a floppy disk controller (FDC) 42, a hard disk controller (HDC) 41, a keyboard controller (KBC) 36, and a VGA controller (VGAC) 35. The personal computer 100 is connected to a printer unit 200 through internal buses.

Printer Unit

The printer unit 200 incorporated in the notebook personal computer 100, the color scanner unit detachably connected to the printer unit 200, and a print head unit will be described with reference to FIGS. 7 and 8.

Figure 7:
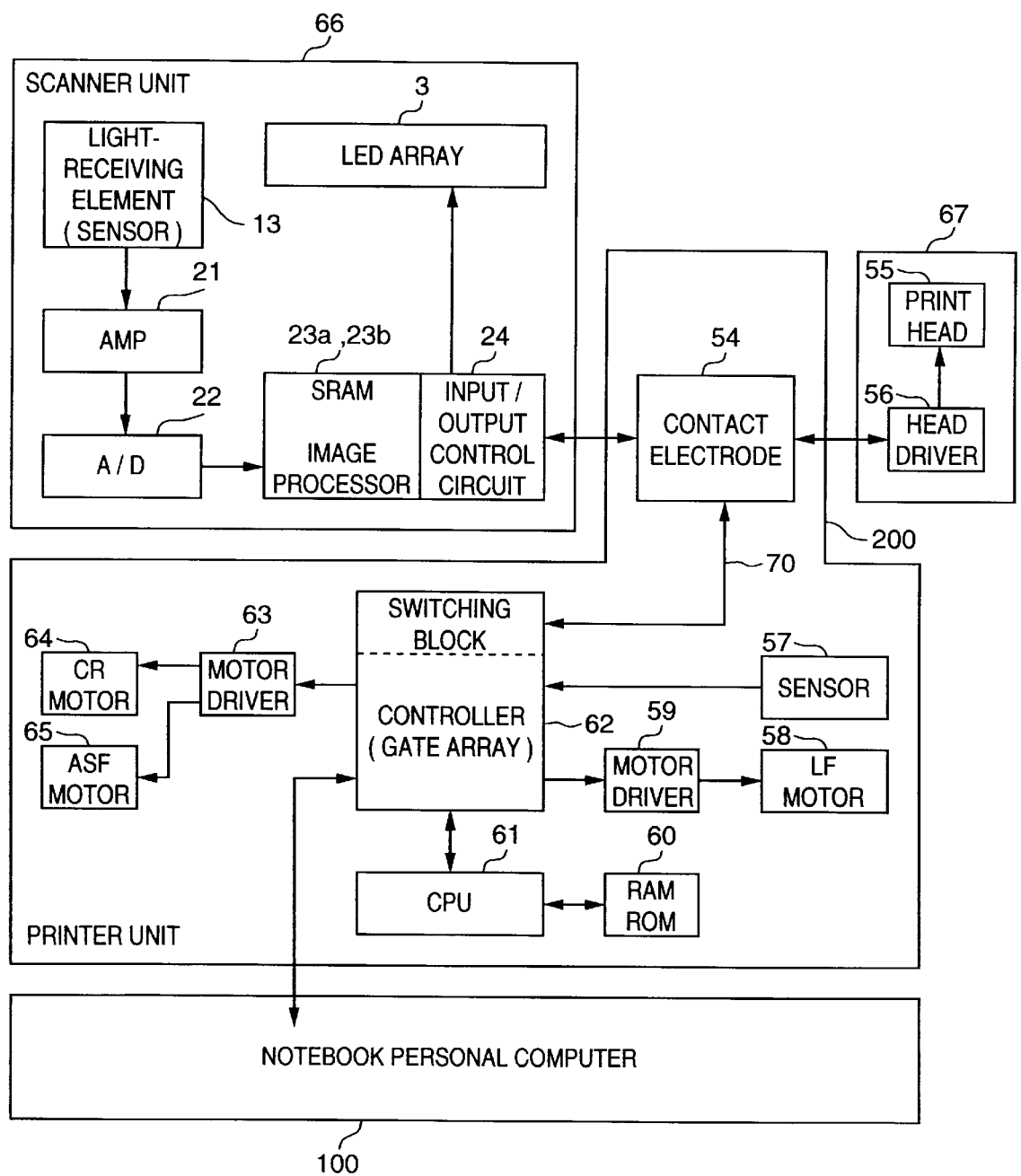
FIG. 7 is a block diagram showing the arrangement of a printer unit, a scanner unit to be connected to the printer unit, and a print head unit.

FIG. 7 is a block diagram showing the arrangement of the printer unit 200, a scanner unit 66 to be connected to the printer unit 200, and a print head unit 67. A CPU 61 and a controller 62 of the printer unit 200 perform control of three monitors (a carriage (CR) monitor 64, a line feed (LF) monitor 58, and an auto-sheet feed (ASF) motor 65) through monitor drivers 63 and 59, drive control of a sensor 57 for detecting the home position, the ASF position, and feed/delivery of printing paper, and drive control of the scanner unit and the print head unit. As described above, one of the scanner unit 66 and the print head unit 67 can be mounted on the printer. The joint portion of a carriage 69 of the printer unit 200 on which the scanner unit 66 or the print head unit 67 is mounted has a contact electrode 54. When the scanner unit 66 or the print head unit 67 is mounted, the scanner unit 66 or the print head unit 67 is electrically connected to the printer unit 200 through this contact electrode 54.

As a method of determining a unit mounted on the printer unit, the connector unit of the scanner unit 66 or the print head unit 67 has an electrode representing the ID of the unit, and the CPU 61 reads this ID to determine whether the mounted unit is the scanner unit 66 or the print head unit 67.

The print head unit 67 comprises a print head 55 for performing printing with CMY or CMYK inks and a head driver 56.

Figure 8:
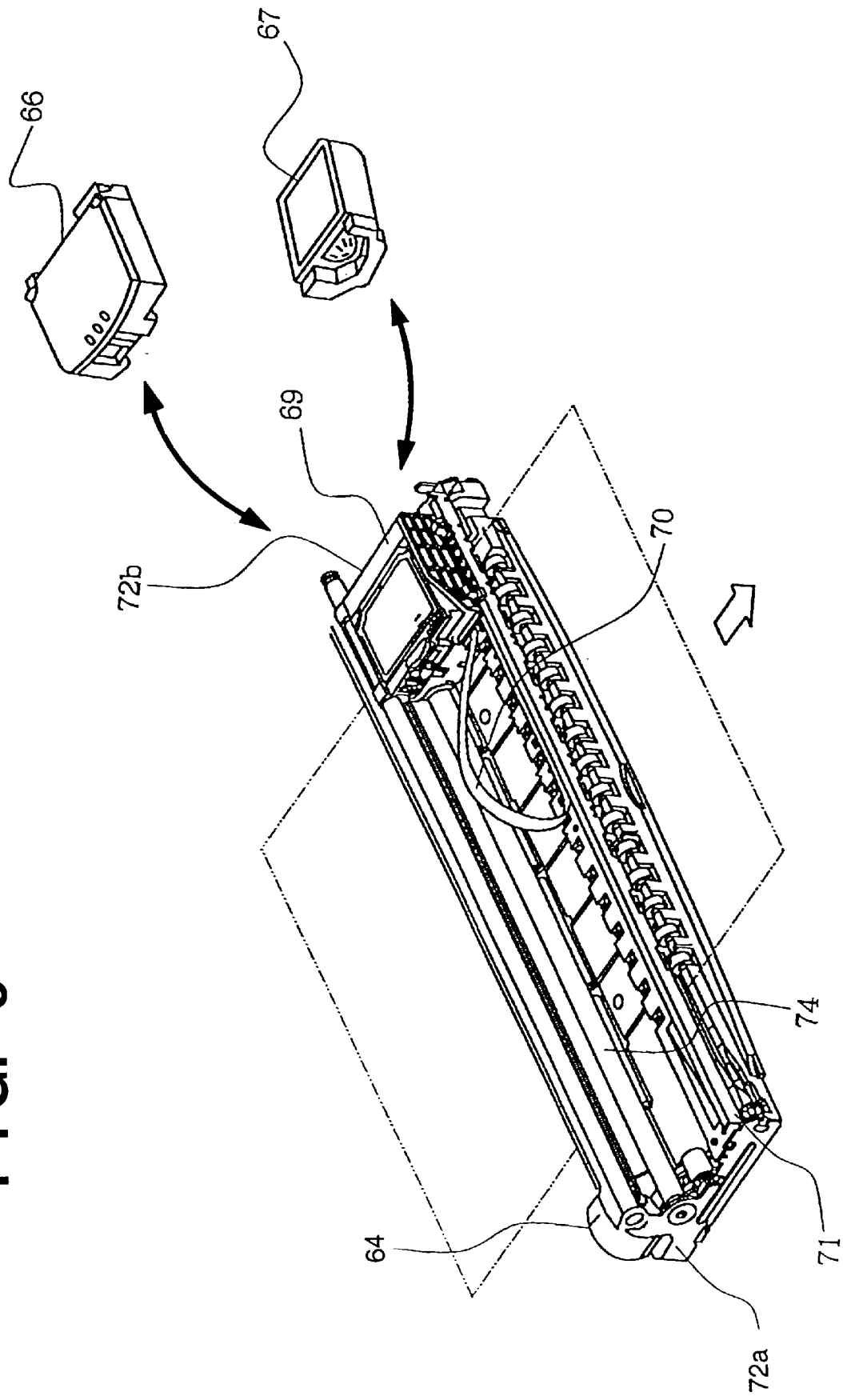
FIG. 8 is a view showing a state in which the scanner or print head unit is to be mounted on the printer unit.

FIG. 8 is a view showing a state in which the scanner unit 66 or the print head unit 67 is to be mounted on the printer unit 200. The print head unit 67 for printing an image on printing paper and the scanner unit 66 for reading an original image can be interchangeably mounted on the printer unit 200. The scanner unit 66 has a size almost equal to that of the print head unit 67 and is mounted on the carriage 69 for use. The contact electrode 54 for exchanging signals through the connector unit 20A of the scanner unit 66 is arranged in the carriage 69. An image signal output from the scanner unit 66 is processed in the CPU 61 in the printer unit 200 through the contact electrode 54 and a flexible cable 70. The carriage 69 is driven by the CR motor 64 and reciprocated between side plates 72a and 72b of a frame along a slide shaft 74 and a slide plate 71.

Electrical Characteristics of LED

Figure 9:
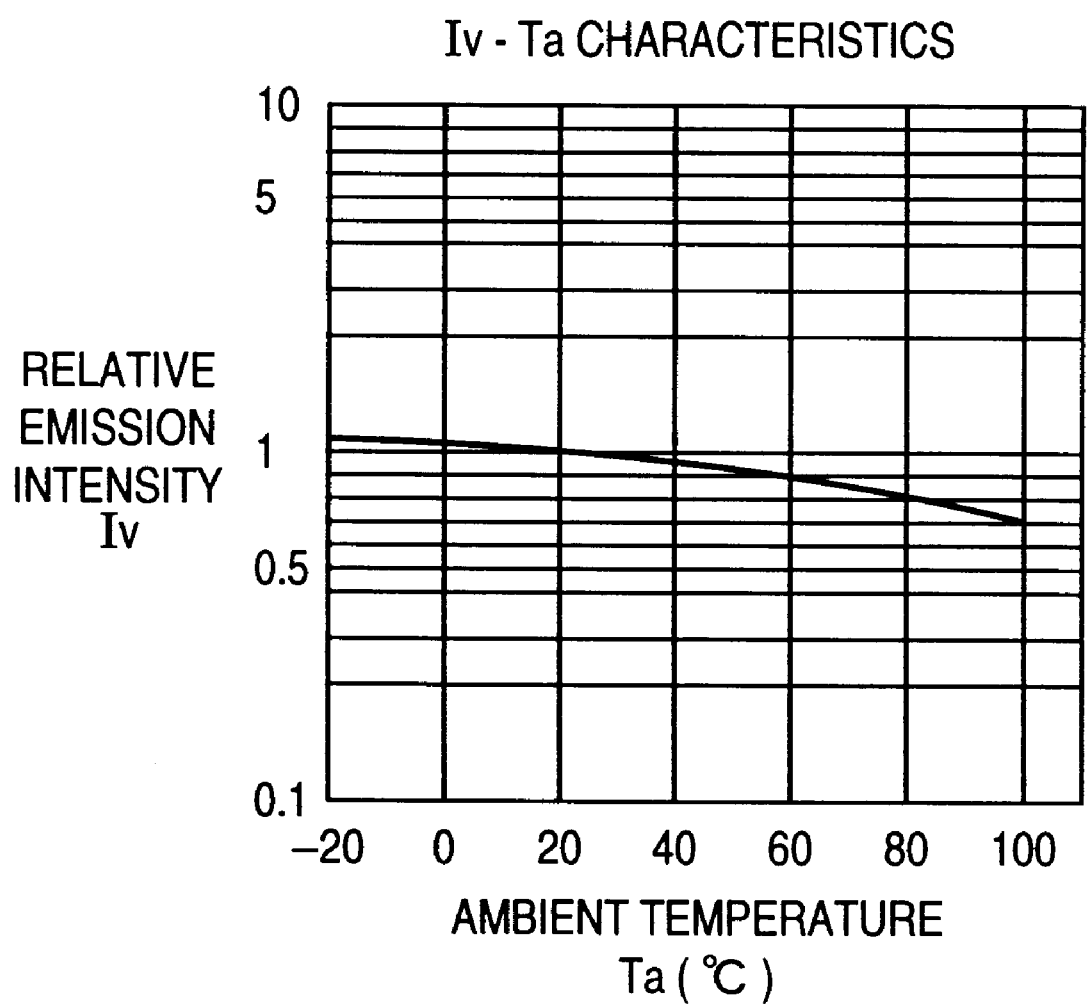
FIG. 9 is a graph showing the relationship between the ambient temperature Ta and the relative emission intensity Iv.

The electrical characteristics of an LED serving as a light source will be described below. FIG. 9 is a graph showing the relationship between the ambient temperature Ta and the relative emission intensity Iv of the LED. As can be apparent from the graph, when the ambient temperature Ta of the LED increases, the relative emission intensity Iv of the LED decreases.

Figure 10:
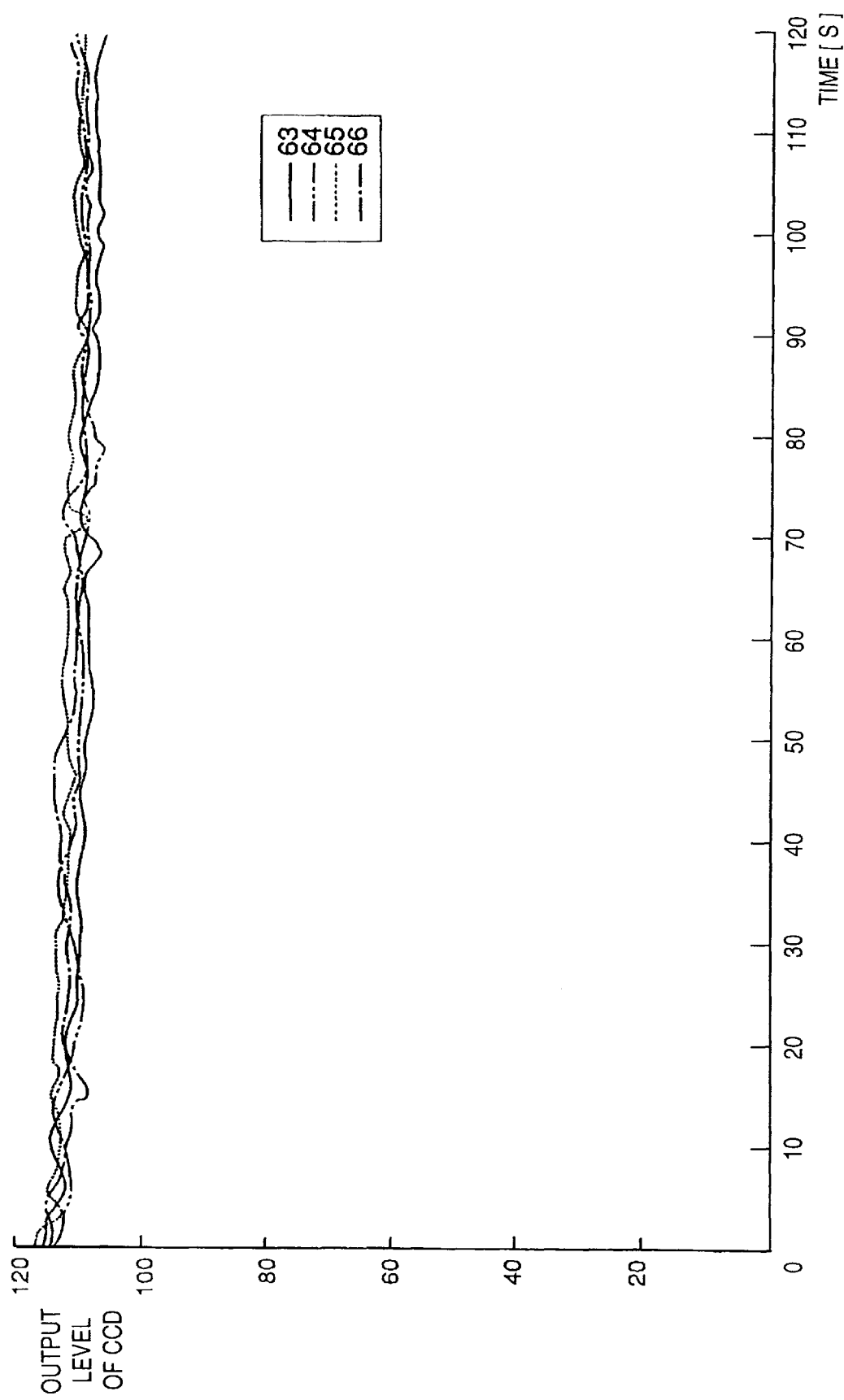
FIG. 10 is a chart showing data obtained when the scanner unit of this embodiment reads a white reference sheet under the conditions that the accumulation time is 256 ms and the drive current of the LED is large.

FIG. 10 is a chart showing the data obtained when the scanner unit of this embodiment reads a white reference sheet under the conditions that the accumulation time is 256 ms and the drive current of the LED is large. A time (unit: sec) is plotted along the abscissa and represents a period after the LED is turned on. Image signals output from the scanner unit 66 are plotted along the ordinate in 256 levels. In this embodiment, the light-receiving element 13 of the scanner unit 66 is constituted by 128 pixels, but only data of the 63rd to 66th pixels are shown in FIG. 10. As shown in FIG. 10, when the LED is turned on and heated, the relative emission intensity Iv decreases. A change in relative emission intensity Iv is not proportional to the lapse of time, but abruptly changes immediately after the start of emission.

Preheating and Heat-Keeping Control

When an image read operation by the scanner unit 66 is taken into consideration, LED emission during the image read operation is performed in strong driving in order to increase the S/N ratio of the light-receiving element 13. However, during the return of the carriage 69 to the home position, the LED is kept off to suppress power consumption of the LED.

When the LED temperature rise almost saturates immediately before the start of the return of the carriage 69, the LED relative emission intensity Iv is assumed to have the stablest state. In FIG. 10, the stablest state is obtained when the output level of the light-receiving element 13 is about 110. In this embodiment, preheating and heat-keeping control are performed to eliminate output variations caused by the LED temperature range during the image read operation under a given atmosphere. As can be apparent from FIG. 10, a period required for the output level of the light-receiving element 13 to reach the stable state, i.e., "110" is about 60 sec from the start of LED emission. The preheat time is set to 60 sec in this embodiment. Note that all the LEDs are turned on in preheating so as to attain the stable state within a shortest period of time. Alternatively, a temperature sensor such as a thermistor may be arranged in the scanner unit to measure the actual temperature, thereby managing the preheat time.

The thermal equilibrium condition in the image read operation is given as follows:

$$\{R(\text{strong driving, }100\%) + G(\text{strong driving, }100\%) + B(\text{strong driving, }100\%)\}/6 = \text{one color}(\text{strong driving, }100\%)/2$$

The left-hand side of the above equation indicates that the carriage in the color image read scanning reciprocates three times, i.e., six scan operations. For this reason, heat to be generated is equal to ½ the operation in which an LED of one color emits light. The percentage in the parentheses in the above equation represents the duty ratio of the emission time. In this embodiment, the ON/OFF control of the LED is performed at frequencies of 3.9 kHz, 6.25 kHz, and 6.51 kHz, and data are set in predetermined bits of a register (not shown) to allow control of LED emission duty ratios as 0%, 25%, 50%, 75%, and 100%.

When the LED relative emission intensity Iv is set in the stable state, the LED must consume the same power as in the image read state to maintain the stable state in an interval until the next image read operation is started. This control is heat-keeping control and represented as follows:

$$\text{Heat Keeping} = R, G(\text{weak driving, }100\%)$$

Figure 11:
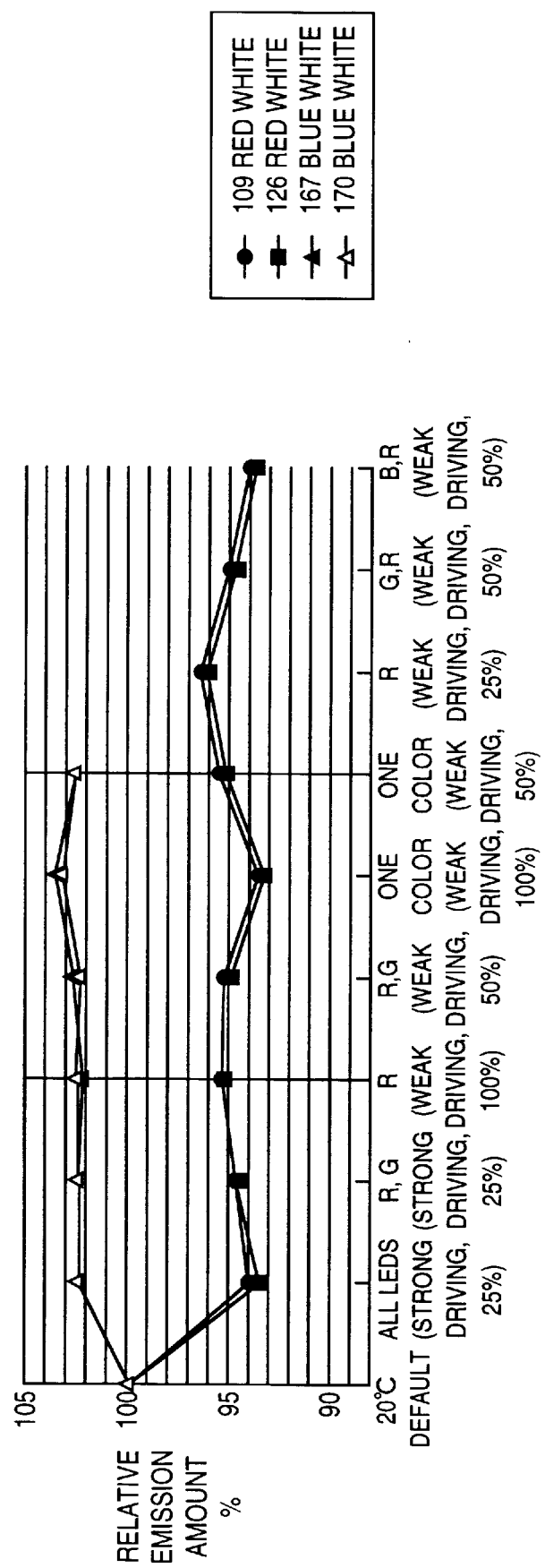
FIG. 11 is a graph showing changes in LED emission intensity when the heat-keeping condition is changed.

FIG. 11 shows changes in LED emission intensity when the heat-keeping condition is changed. The relative emission intensity is plotted along the ordinate when the relative emission intensity without any heat-keeping control is defined as 100%. The heat-keeping conditions are plotted along the abscissa. One color(strong driving, 50%) indicates the state of a current flowing in the image read operation and has the same emission intensity as in R(weak driving, 100%). When heat keeping is performed in R(weak driving, 100%), the same state as in the image read operation can be maintained regardless of the colors (red and blue) of the LEDs. In the notes of FIG. 11, "109 red white" represents the white reference value obtained by the 109th pixel of the CCD while the red LED is kept on, which also applies to other examples. Note that data for the green LED is not listed because its thermal variations are small.

Under the same atmosphere, preheating and heat-keeping control are performed to stably obtain high-quality images.

Image Reading Mode

As shown in FIGS. 12A to 12C, this embodiment has three image read odes, i.e., a color mode, a monochrome multivalue mode, and a monochrome binary mode. In each image reading mode, five resolutions, i.e., 360×360 dpi, 180×180 dpi, 90×90 dpi, 200×360 dpi, and 300×360 dpi are available.

Four accumulation times, i.e., 256 ms, 320 ms, 307 ms, and 288 ms are available in accordance with the relationship between the five resolutions and the carriage speed.

White Reference Control

In this embodiment, in reading a color image, the LEDs serving as the light sources for the three colors, i.e., R, G, and B are alternately turned on. The emission intensity and the temperature characteristics change depending on the colors of the light sources. For this reason, a white reference is set, and the gain of the amplifier 21 is adjusted on the basis of the white reference.

Figure 13:
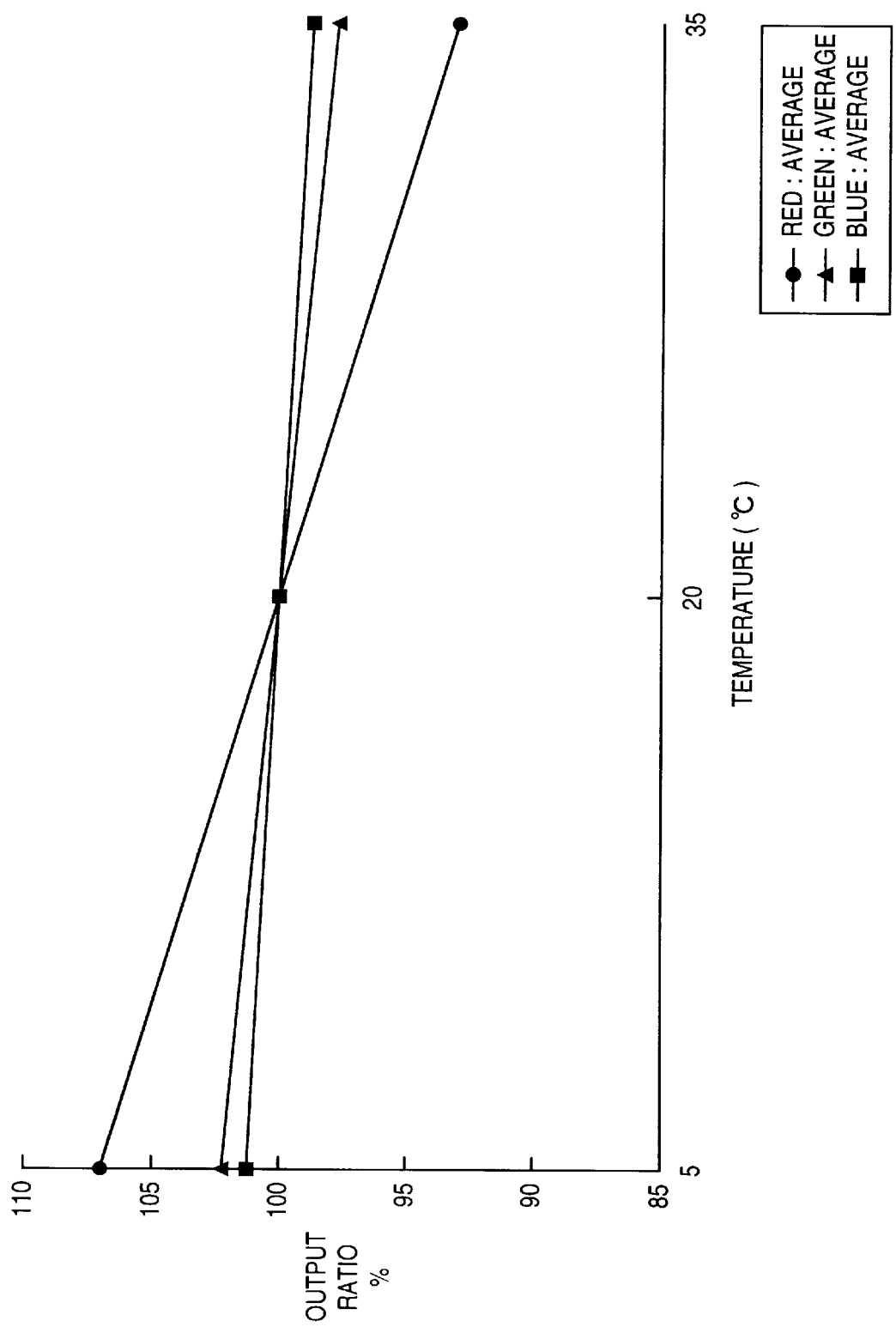
FIG. 13 is a graph showing LED ambient temperature characteristics obtained in units of colors, i.e., R, G, and B in this embodiment.

FIG. 13 is a graph showing the ambient temperature characteristics of the LEDs which are obtained in units of colors, i.e., R, G, and B. Since slight variations occur even in the emission intensities of LEDs of the same color, an average value of 14 samples of each color is obtained. A ratio of an emission intensity to the LED emission. intensity of 100% at the ambient temperature of 20° C. is plotted along the ordinate. The ambient temperature is plotted along the abscissa. As can be apparent from FIG. 13, output changes caused by changes in ambient temperature are different depending on the differences in materials of the LED emission colors. The custom IC 15 prepared for the color scanner unit in obtaining the white reference detects the peak of a white reference profile for a signal of each color output from the light-receiving element 13 and controls the gain of the amplifier 21 to set the dynamic range of the A/D converter 22 in an optimal state. Note that the gain of the amplifier 21 can be set in 256 levels.

The white reference data of this embodiment is determined for each of the R, G, and B colors as follows:

white data (white reference value): 128 pixels×10 bits gain data: 8 bits black data (offset value): 128 pixels×8 bits 2-byte temperature data and a 2-byte head ID are added to the white reference data to manage the white reference data.

Figure 14:
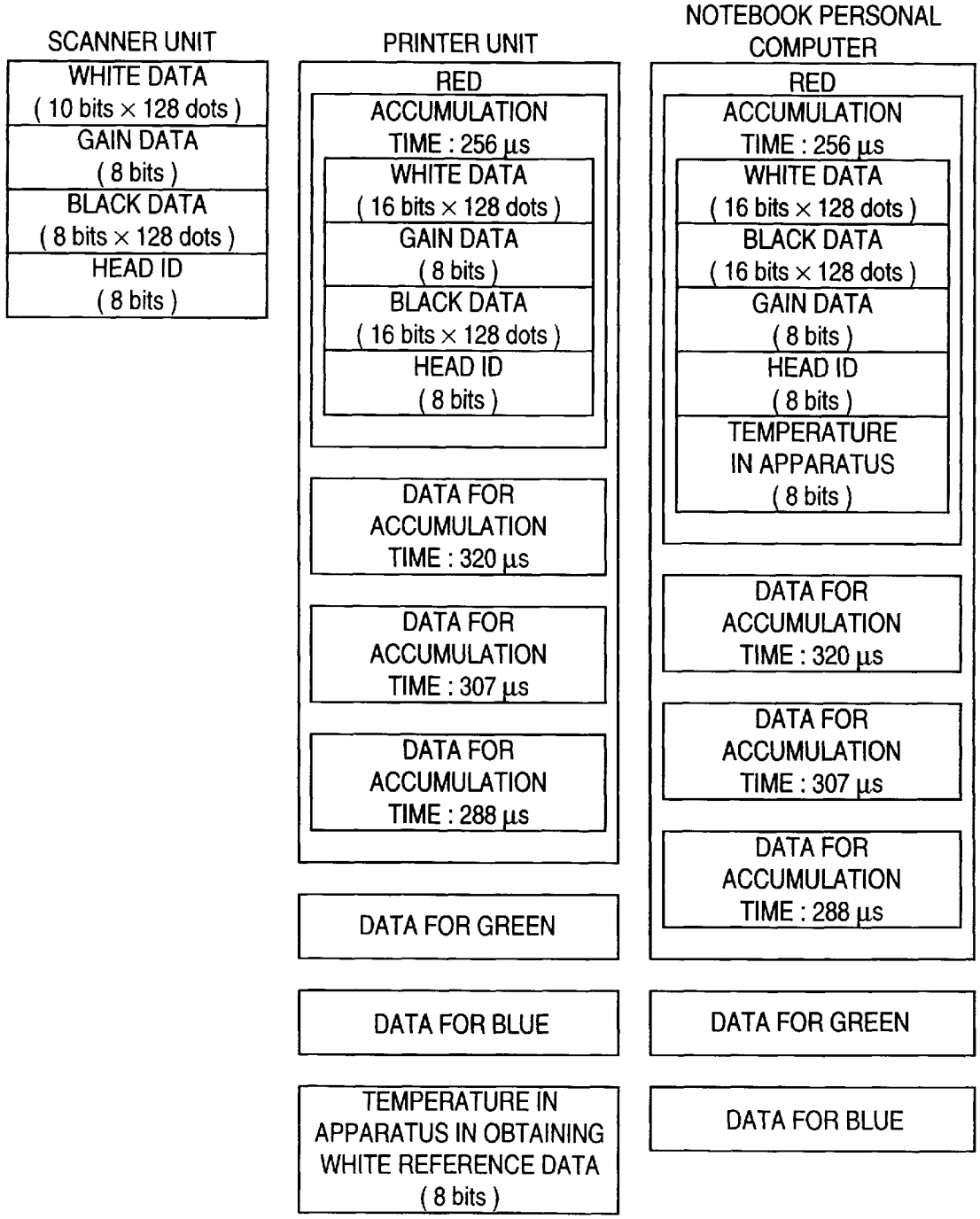
FIG. 14 is a view showing a method of managing white reference data.

The white reference data having the above structure is managed in the scanner unit 66, the printer unit 200, and the notebook personal computer 100, as shown in FIG. 14. More specifically, the SRAM 23a in the scanner unit 66 stores white data, gain data, black data, and a head ID for one color corresponding to the currently set accumulation time. Note that the data stored in the SRAM 23a is data of one color corresponding to one resolution.

For example, in reading color image at 360 dpi, the red LED is turned on, and the white reference data of the red accumulation time of 256 ms is loaded from the RAM 60 to the SRAM 23a in the scanner unit 66 to read the image of the red component in accordance with a program executed by the CPU 61. When the read operation for the red component is complete, the green LED is turned on, and the white reference data of the green accumulation time of 256 ms is loaded from the printer RAM 60 to the SRAM 23a to read an image of the green component. In this case, when the green white reference data is loaded in the SRAM 23a, the red white reference data is overwritten and erased. That is, as can also be apparent from FIG. 14, only one white reference data is present at a time in the scanner unit 66. The table of the white reference data corresponding to the respective accumulation times and the respective colors is stored as a file in the printer RAM 60 or a hard disk drive (HDD) 40 in the notebook personal computer 100. Only one white reference data corresponding to the accumulation time and color under processing is present in the scanner unit 66.

The white reference data on the printer firmware executed by the CPU 61 in the printer unit 200 are, for each of the accumulation times (256 ms, 320 ms, 307 ms, and 288 ms) corresponding to all the resolutions shown in FIGS. 12A to 12C, effective 10-bit (management: 16 bits) white data for 128 pixels, 8-bit gain data, effective 8-bit (management: 16 bits) black data for 128 pixels, and an 8-bit head ID. These data are prepared in units of colors, i.e., R, G, and B. At the same time, the white reference data also has 8-bit data representing the ambient temperature in white reference detection. The firmware calculates the difference between the current ambient temperature and the temperature in white reference detection and corrects and uses the white reference data in the printer RAM 60 on the basis of this temperature difference.

On the other hand, a printer driver executed by a CPU 30 in the notebook personal computer 100 stores a maximum of five white reference data in a VRAM 38 or the HDD 40 serving as the internal storage means in the notebook personal computer 100 and manages these data in accordance with the temperature and time stamp. Although temperature management will be described in detail later, the effective temperature range of one white reference data is set to fall within ±5° C. of the temperature in obtaining white reference data. Time stamp management is performed in consideration of degradation of the light source over time and discards white reference data used in image read operations 100 times or more. The printer driver sends the latest white reference data having the current ambient temperature within the effective range to the printer firmware.

Figure 15:
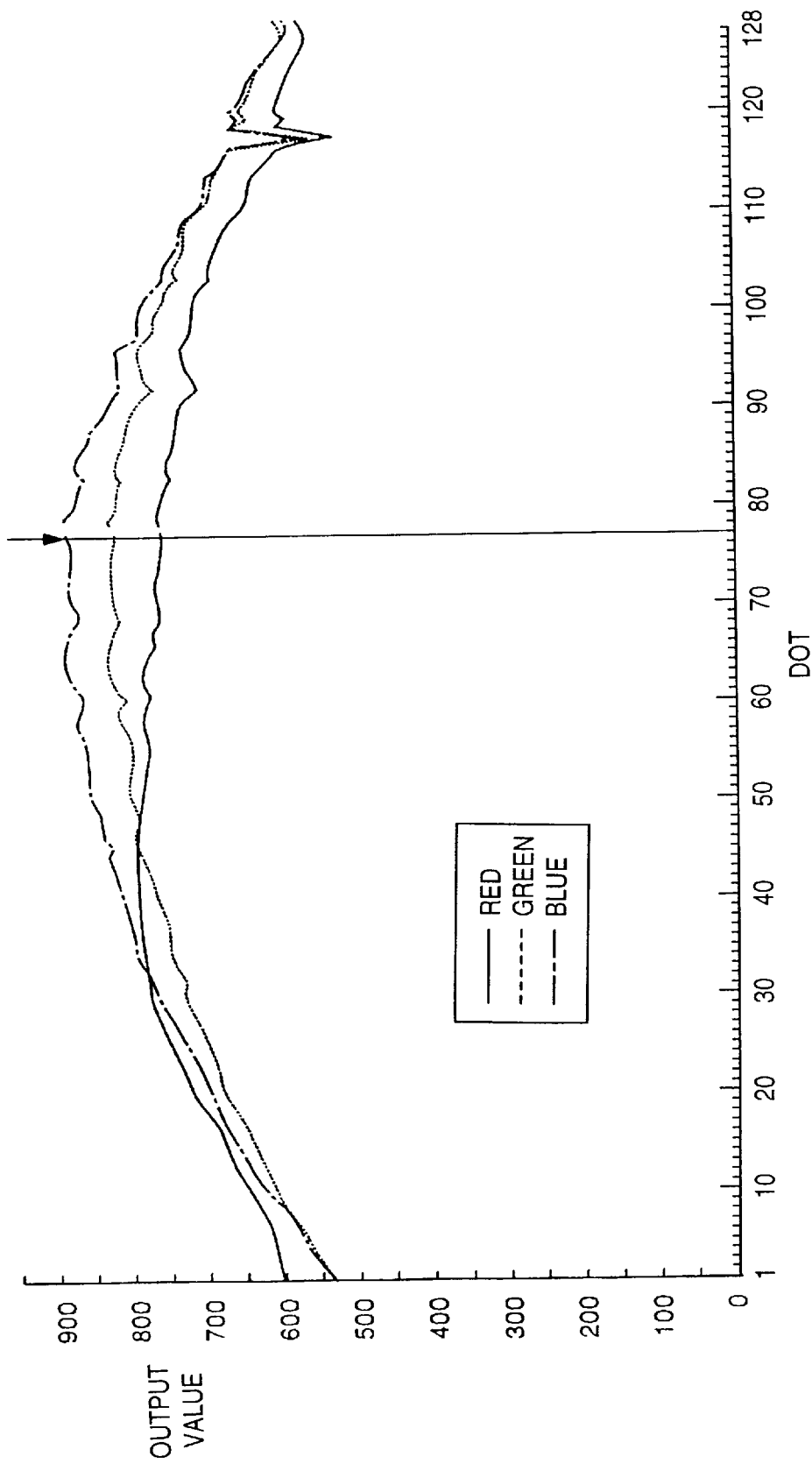
FIG. 15 is a graph showing an RGB white reference profile.

FIG. 15 shows white data when a white reference is obtained at room temperature (25° C.). The A/D-converted values (10 bits) of the photoelectrically converted signals are plotted along the ordinate. The read width (i.e., 128 pixels) of the light-receiving element 13 is plotted along the abscissa. A triangle corresponds a red LED output; a cross, a green LED output; a circle, a blue LED output. As shown in FIG. 15, the outputs from the 128 pixels are not uniform depending on the layout of the LEDs and the positional relationship between each LED and the lens. In addition, peak values of the output profiles in the respective colors are different from each other. Therefore, the image read operation is performed using 64 pixels from the 33rd pixel to the 96th pixel of the central portion.

Correction for White Reference Control

LEDs have representative emission intensity characteristics shown in FIG. 13. However, even LEDs of the same color have variations in emission intensity characteristics. When the characteristics shown in FIG. 13 are directly applied to an actual LED product, an error may increase. In this embodiment, correction for white reference control is performed by the following method.

(1) Temperature information serving as a reference temperature is added to the white reference data of each accumulation time, the effective temperature range in which this white reference data can be used is defined to fall within ±5° C. of the reference temperature, and another white reference data is required when the white reference data falls outside the above temperature range.

(2) A maximum of five white reference data are managed.

(3) A peak gain Gw in obtaining white reference data is obtained by the following equation:

$$Gw = -L(64+Gf) + Gf \tag{1}$$

where Gf is the gain obtained in a peak search (to be described later), and L is an output variation coefficient. Substitutions of red LED L=+0.05, green LED L=+0.02, and blue LED L=0 as the output variation characteristics of the LEDs of the respective colors for the ambient temperature into equation (1) yield the peak gains Gw of the respective colors.

(4) Temperature correction is performed for white reference data using correction coefficients a of the LEDs of the respective colors in accordance with the temperature differences between the reference temperatures of the white reference data and the ambient temperature in image read operation. This temperature correction is performed by printer firmware serving as the second correction means and the control means which are executed on the CPU 61 and the controller 62:

red LED: a=−0.5%/° C.
green LED: a=−0.2%/° C.
blue LED: a=0.0%/° C.

White Reference Obtaining/Setting Process

Figure 16:
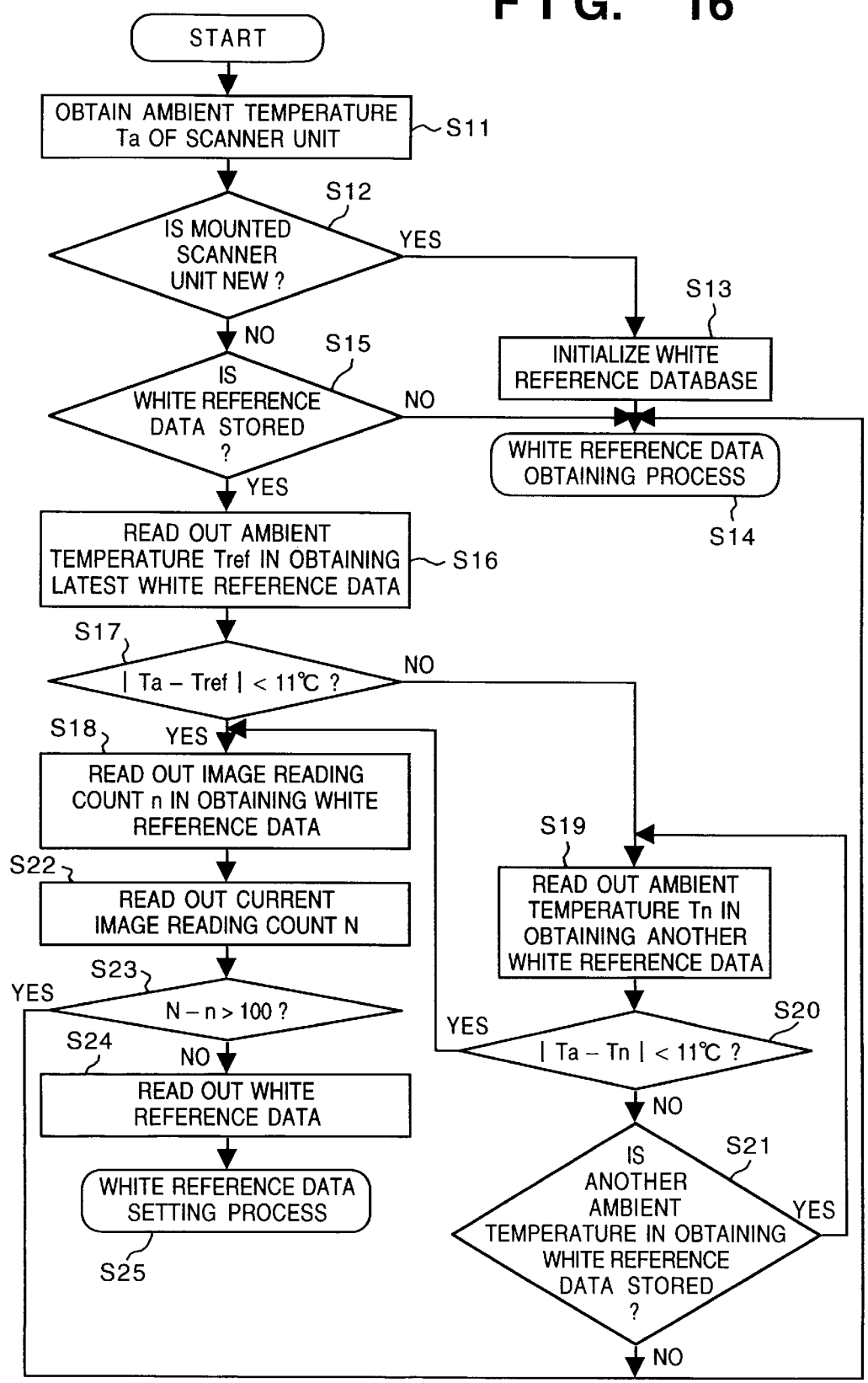
FIG. 16 is a flow chart showing a white reference obtaining/setting process of this embodiment.

FIG. 16 is a flow chart showing a white reference obtaining/setting process by a printer driver serving as a detection means. In step S11, the ambient temperature Ta of the scanner unit 66 is obtained. It is determined in step S12 whether the scanner unit 66 is a new product. If YES in step S12, the flow advances to step S13 to initialize the white reference database. In step S14, a white reference data obtaining process for obtaining new white reference data is executed.

If NO in step S12, the flow advances to step S15 to detect whether white reference data corresponding to the ID of the scanner unit 66 is stored. If NO in step S15, white reference data is obtained in step S14. However, if YES in step S15, the flow advances to step S16 to read out an ambient temperature Tref in obtaining the latest white reference data.

It is determined in step S17 whether the temperature difference between the current ambient temperature Ta and the ambient temperature Tref in obtaining the latest white reference data is less than 11° C. If YES in step S17, the flow advances to step S18.

However, if NO in step S17, the flow advances to step S19 to read out an ambient temperature Tn in obtaining white reference data except for the latest white reference data. It is determined in step S20 whether the difference between the current ambient temperature Ta and the ambient temperature Tn is less than 11° C. If YES in step S20, the flow advances to step S18; otherwise, it is determined in step S21 whether white reference data at another ambient temperature is stored. If YES in step S21, the operations in steps S19 and S20 are repeated. If NO in step S21, white reference data is obtained in step S14.

In step S18, an image read count n in obtaining white reference data is read out. In step S22, a current image read total count N is read out. The flow advances to step S23 to determine whether the difference between the current image read total count N and the image read count n in obtaining the white reference data exceeds 100. If YES in step S23, white reference data is obtained again in step S14. If NO in step S23, the flow advances to step S24 to read out this white reference data, and the flow advances to a white reference data setting process (step S25).

Figure 17:
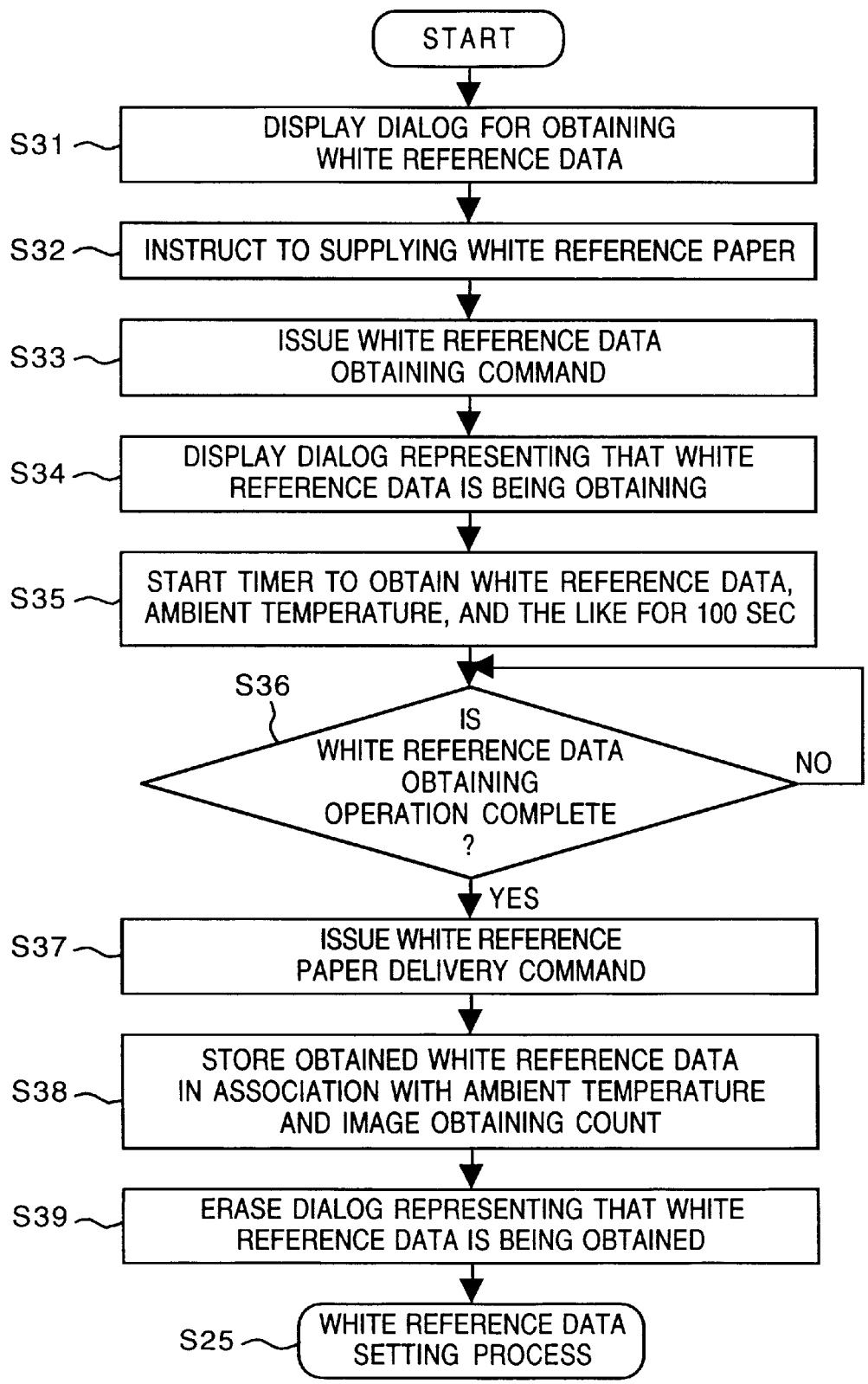
FIG. 17 is a flow chart showing a white reference data obtaining process of this embodiment.

FIG. 17 is a flow chart for explaining a white reference data obtaining process in step S14. In step S31, a dialog representing a process for obtaining white reference data is displayed on the LCD 101. In step S31, an operator is prompted to feed white reference paper. When the white reference paper is fed by the operator, a white reference data obtaining command is issued in step S33. In step S34, a dialog representing that the white reference data is being obtained is displayed.

The flow advances to step S35 to start a timer to obtain white reference data, an ambient temperature, and the ID of the scanner unit 66 for, e.g., 100 sec. During this period, a message "processing" is displayed in the dialog. It is determined in step S36 using the timer whether the white reference data obtaining operation is complete. Control waits until the data obtaining operation is complete. If YES in step S36, a white reference paper delivery command is issued in step S37. In step S38, the obtained white reference data is stored in association with the corresponding ambient temperature and the corresponding image obtaining total count. The dialog representing that the white reference data is being obtained is erased in step S39, thus ending the white reference data obtaining process.

The ambient temperature detection is performed by causing the thermistor to measure a temperature near the LED of the scanner unit 66. However, a relationship between the time elapsed from the LED turn-on timing and the ambient temperature rise may be stored in advance, and the ambient temperature may be estimated on the basis of the elapsed time from the turn-on timing.

Figure 18:
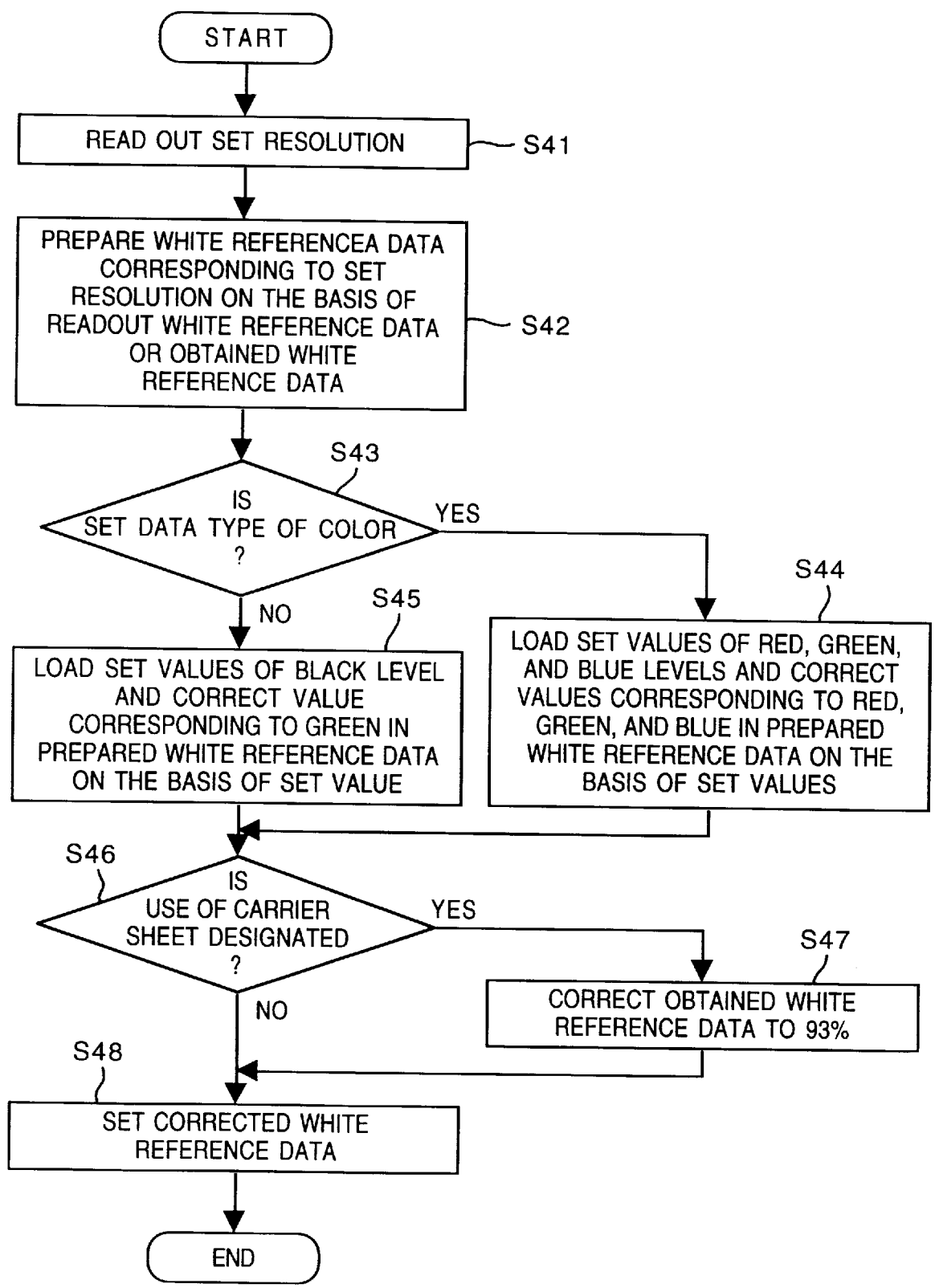
FIG. 18 is a flow chart showing a white reference data setting process of this embodiment.

FIG. 18 is a flow chart for explaining a white reference data setting process in step S24. In step S41, the currently set resolution is read out. In step S42, white reference data corresponding to the current resolution is selected from the readout white reference data or the obtained white reference data and prepared on the memory. It is determined in step S43 whether the set data type is of a color. If YES in step S43, the set values of red, green, and blue levels are loaded to correct the values of the prepared white reference data which correspond to the respective colors. The flow then advances to step S46. If NO in step S43, the flow advances to step S45 to load the preset value of the green level to correct the value of the prepared white reference data which corresponds to green. The flow then advances to step S46.

It is determined in step S46 whether a carrier sheet is designated for reading an original. If YES in step S46, the resultant white reference data is corrected to 93%, and the flow advances to step S48. In step S48, the corrected white reference value data is set, and the process is ended. Note that the carrier sheet comprises a transparent film and a white sheet, and when the image of a thin original is to be read, it is sandwiched between the film and the sheet, thereby properly feeding the thin original. When an original image is to be read using the carrier sheet, the light intensity is attenuated by the film, and correction is required by an attenuation amount. The correction value of 93% of the white reference data is determined in consideration of the light intensity attenuated by the film.

As described above, the ambient temperature in obtaining white reference data is used as a reference to set the temperature range of ±5° C. One white reference data is used within this temperature range, and the white levels of the image signals read on the basis of a maximum of five white reference data can be corrected. Even under the conditions as circuit simplification and power consumption suppression due to dimensional limitations when the scanner unit 66 is mounted on the printer unit 200 incorporated in the notebook personal computer 100, a high-quality image can be read without any influence of the ambient temperature. In particular, in the temperature range of 5° C. to 35° C. in which the apparatus of the present invention can be used, the influence caused by a maximum variation of 15% in LED emission intensity upon a change in temperature can be eliminated.

Peak Search

The peak search function of the white reference in the custom IC 15 of this embodiment will be described below. The white reference data is constituted by 10-bit data for 128 pixels in units of colors. A peak search is to detect a peak from the data of 128 pixels and to determine the gain of the A/D converter 22 such that the detected peak becomes the maximum value of the dynamic range of the A/D converter 22 so as to make the white data fall within the dynamic range of the A/D converter 22.

Figure 19:
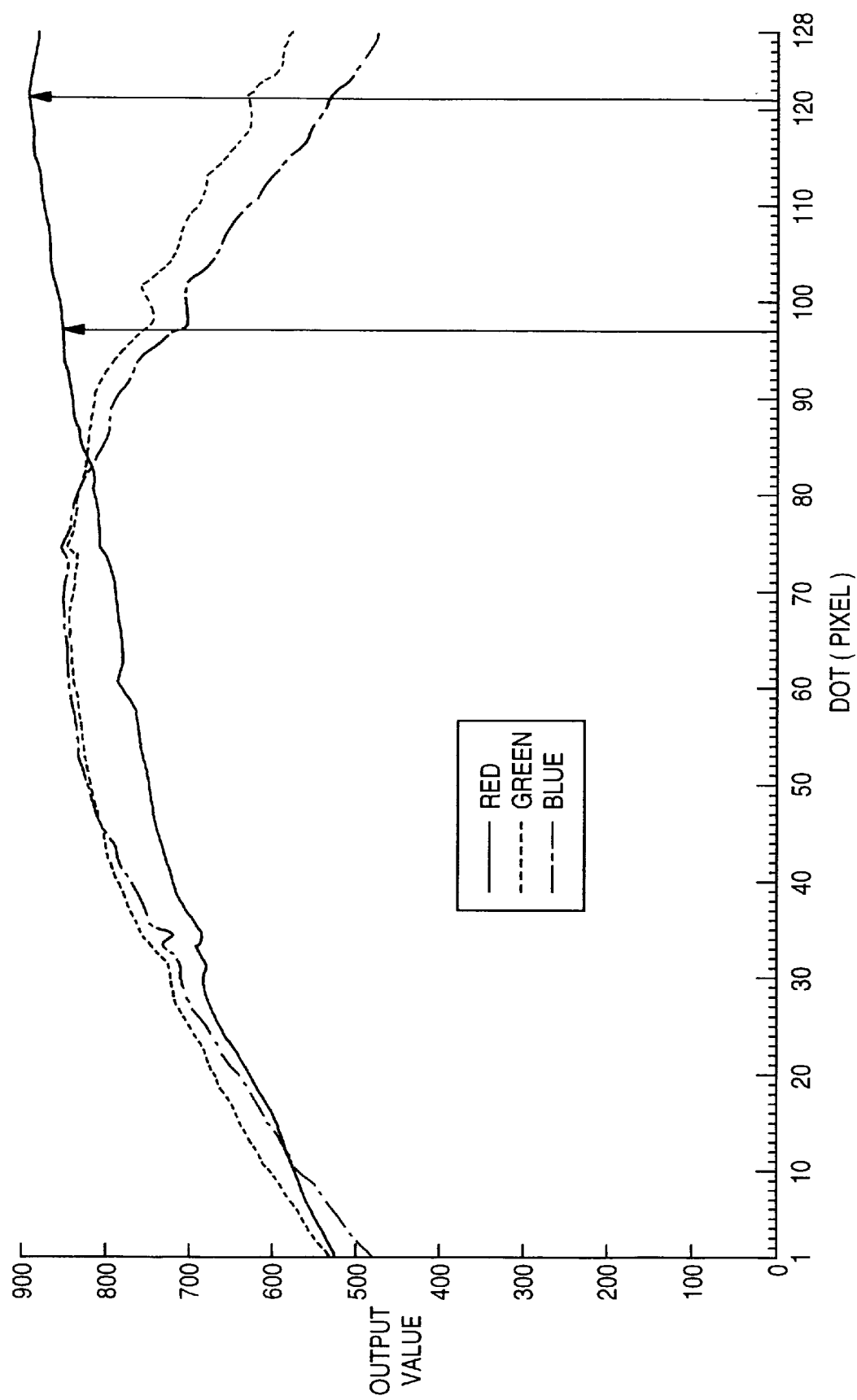
FIG. 19 is a graph for explaining irregular white data.

When this function is used, data of the 77th pixel indicated by an arrow is detected as a peak in, e.g., the blue output profile shown in FIG. 15, and the gain is so determined as to make the output from this pixel be the maximum value of the dynamic range of the A/D converter 22. Like the red output profile shown in FIG. 19, however, when no peak is present in the 33rd pixel to the 96th pixel (the width of these pixels may also be called a 64-pixel width hereinafter) used for image read operation, and a peak is present in the 121st pixel indicated by an arrow, the gain is so determined as to make the output from the 121st pixel be the maximum value of the dynamic range of the A/D converter 22 in the normal peak search. In this case, the gain must be determined using the 97th pixel as the peak. The use of the 121st pixel degrades the resolution accordingly.

White reference data in this state, i.e., a state in which a white data peak is absent in the 64-pixel width in the peak search, and the difference between the peak value in the 64-pixel width and the peak value outside the 64-pixel width is 5% or more is called "irregular white data". The peak falls outside the central pixels from the 33rd pixel to the 96th pixel due to, e.g., a positional error in mounting an LED, and a positional errors of a lens and a board on which the LED is mounted. To prevent degradation of the resolution, the following process is performed in this embodiment.

When a peak value in the pixels from the 33rd pixel to the 96th pixel, and a peak value in the pixels from the first pixel to the 32nd pixel and from the 97th pixel to the 128th pixel are defined as S1 and S2, gain conversion is performed by the following equation for S1/S2<0.95, thereby determining the gain Gf. Optimal white reference data in the pixel width from the 33rd pixel to the 96th pixel is obtained:

$$Gf=(1-S1/S2)\times(64+Gs)+Gs \qquad (2)$$

where Gs is the gain obtained by a peak search within the 128-pixel range. If S1/S2>0.95, then white reference data is obtained for Gf=Gs.

Figure 20:
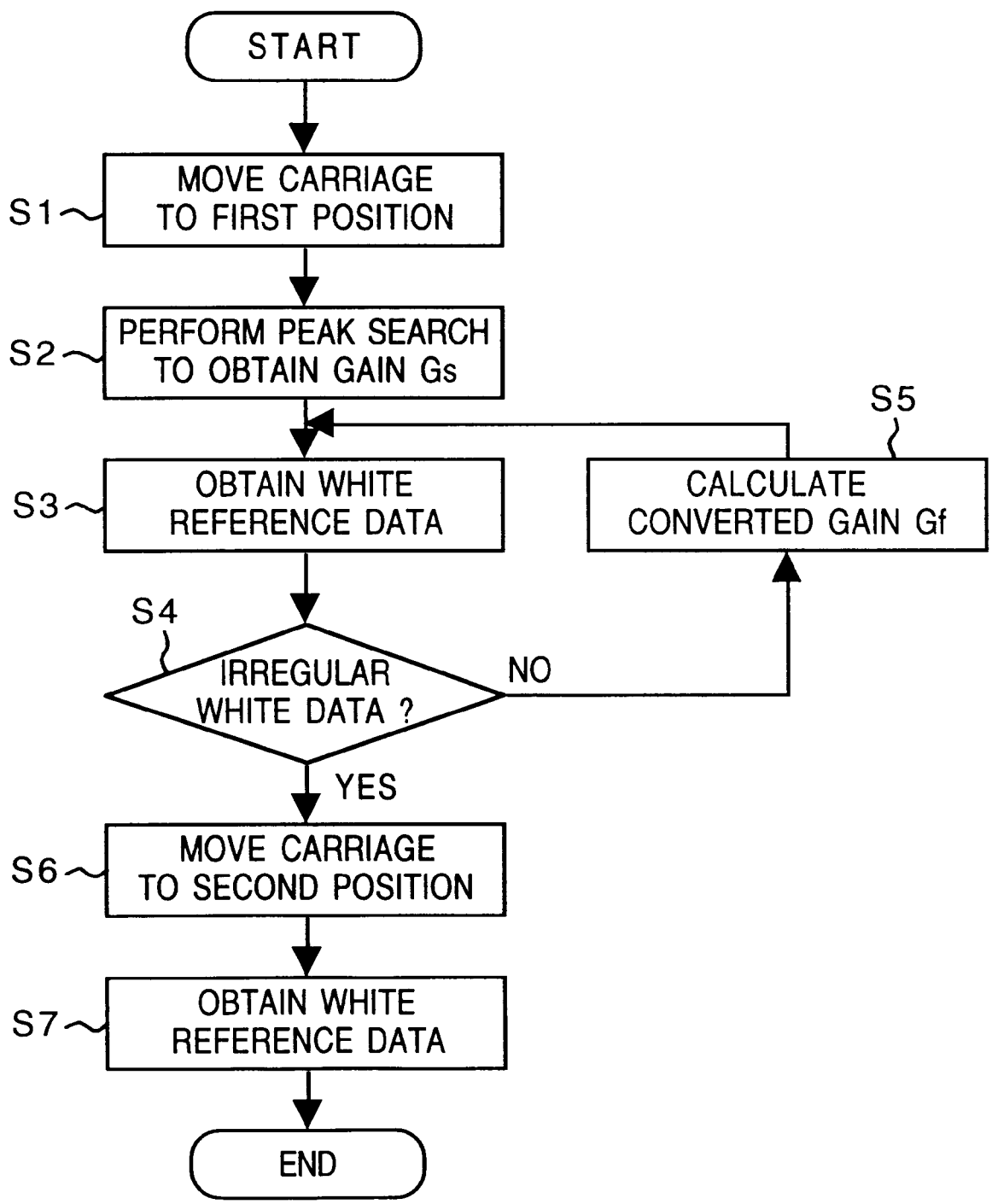
FIG. 20 is a flow chart for explaining a peak search in this embodiment.
Figure 21:
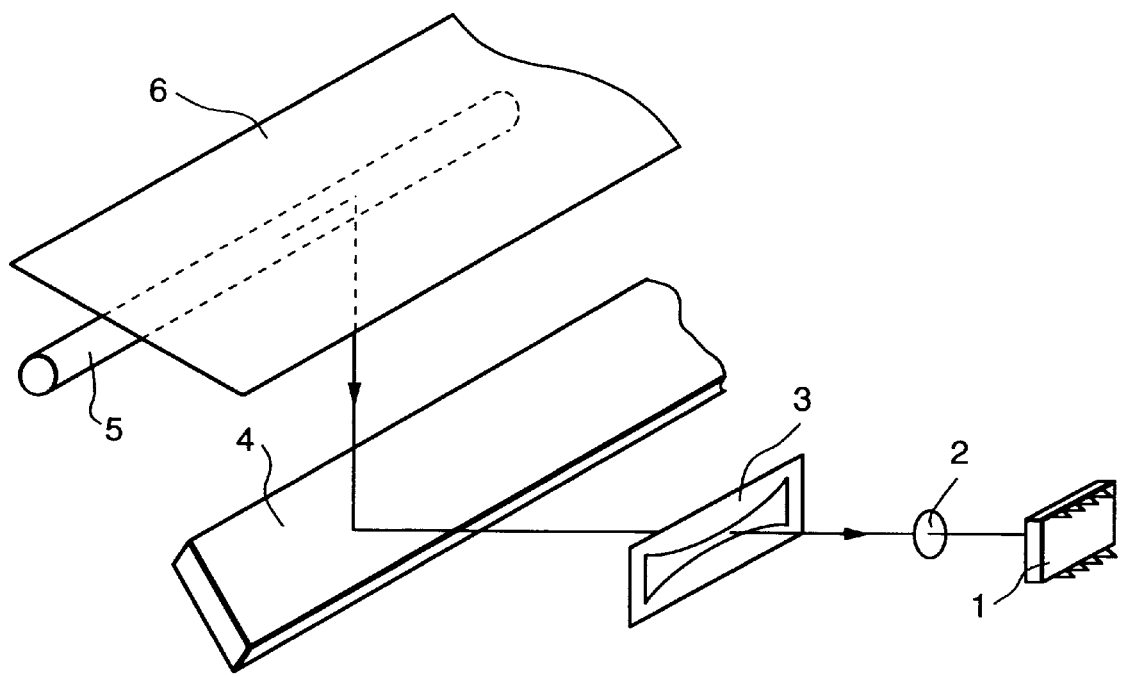
FIG. 21 is a perspective view showing the schematic arrangement of a general reduction optical system.

FIG. 20 is a flow chart for explaining this peak search. The peak search is performed at two positions in the readable range of one line, i.e., near the left end (first position) and the center (second position) in the readable range. In step S1, the carriage 69 is moved to the first position, and a peak search is performed in step S2 to obtain the gain Gs. In step S3, white reference data is obtained. It is then determined in step S4 whether the obtained white reference data is irregular white data.

If YES in step S4, the gain Gf is calculated using the gain conversion equation described above in step S5. If NO in step S4, the carriage 69 is moved to the second position, and white reverence data is obtained in step S7.

By these peak search operations, white reference data can be prevented from being erroneously set caused by the positional error in mounting the LED. Therefore, appropriate white reference data can be obtained within the image read range of the light-receiving element 13.

White Reference Database

FIGS. 22A and 22B are views showing the structure of a white reference database managed by the printer driver. FIG. 22A shows a database area for managing the white reference data obtaining count, and FIG. 22B shows the database area on which the white reference data is recorded. The white reference obtaining count management area comprises the white reference data obtaining count (0th byte), the temperature in obtaining the first white reference data (1st byte) to the temperature in obtaining the fifth white reference data (5th byte), and a supplementary area (6th to 15th bytes).

On the other hand, the white reference data database area stores the first to fifth white reference data. The respective white reference data are white reference data having time stamps in the obtaining operation, and accumulation times of 256 ms, 320 ms; 307 ms, 288 ms, and 307 ms. The white reference data of each accumulation time have red, green, and blue white reference data. The white reference data of each color have white data 1 to white data 128, black data 1 to black data 128, gain data, an ID, and a temperature.

Interface Command

FIG. 23 is a view showing the interface commands for the notebook personal computer (to be also referred to as a host 100 hereinafter) and the printer unit 200. FIG. 24 is a view showing a command string issued from the host 100 in obtaining white reference data. FIG. 25 is a view showing a command string issued from the host 100 in setting white reference data.

As described above, according to this embodiment, the variations in white levels of the image signals, which are caused by changes in ambient temperature, can be reliably corrected using the five limited white reference data stored in the white reference database. Even under the restricted conditions such as compactness, simplification, and power consumption suppression, there can be provided a scanner unit capable of reading a high-quality image without being adversely affected by the ambient temperature, and an image reading apparatus such as a built-in printer on which the scanner unit is to be mounted.

In addition, according to the present invention, inappropriate white reference values caused by the positional errors in mounting LED light sources, and the like can be detected, and appropriate white reference profiles within the image read range can be obtained.

Second Embodiment

The second embodiment of the present invention will now be described below. The same reference numerals denote the same parts and process steps as in the first embodiment, and a detailed description thereof will be omitted.

White Reference Data Obtaining Process

Figure 26:
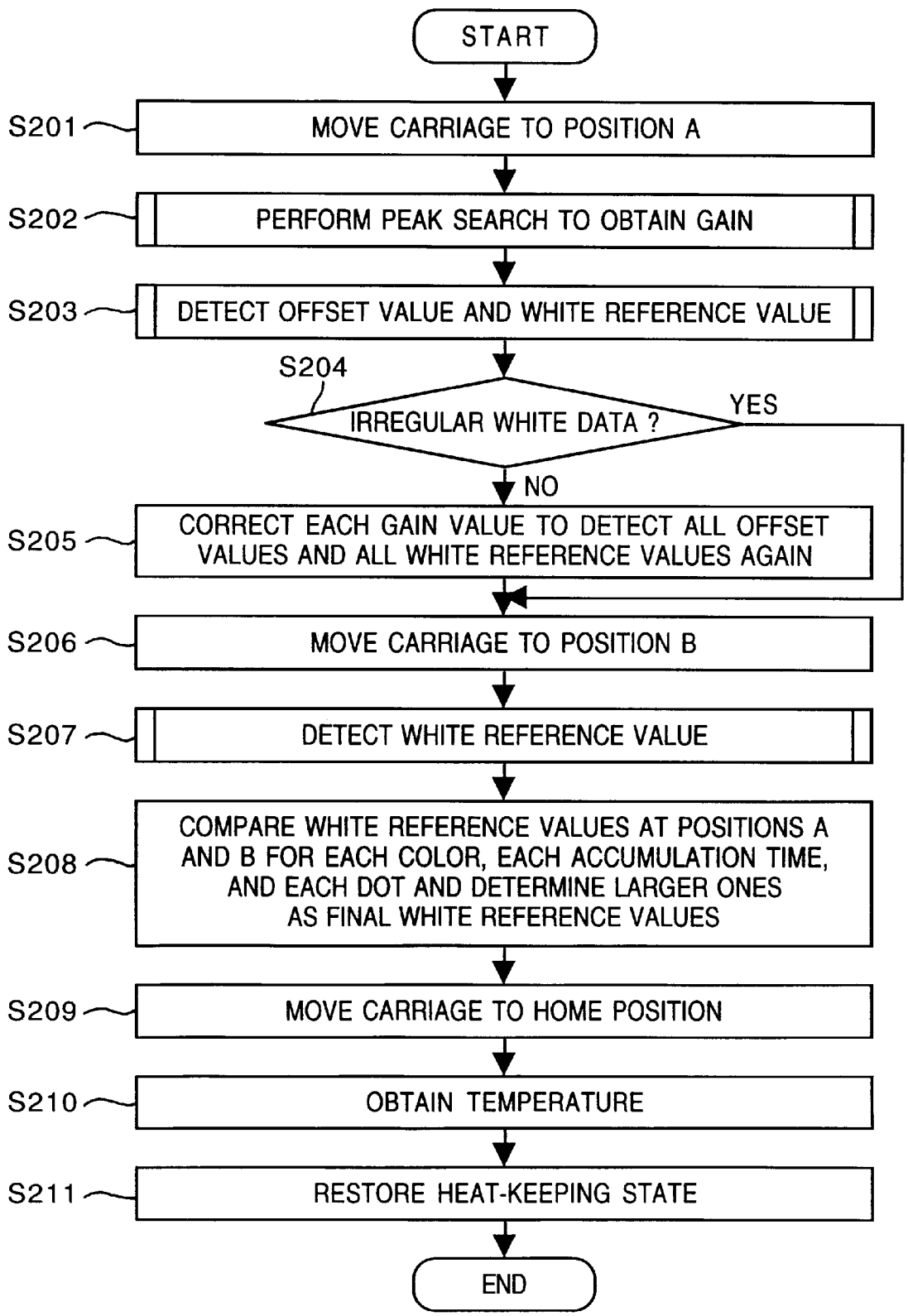
FIG. 26 is a flow chart showing a white reference data obtaining process according to the second embodiment of the present invention.

FIG. 26 is a flow chart showing the white reference data obtaining process according to the second embodiment. The process shown in this flow chart is executed by the CPU 61 in the printer unit 200.

Upon reception of a command parameter ADF0H designating the operation of obtaining white reference data from the host 100, the CPU 61 starts a white reference data obtaining process to generate white reference data and returns the white reference data to the host 100 in accordance with the command string (FIG. 24) from the host 100.

In step S201, the carriage 69 is moved to the position A. In step S202, a gain is detected by a peak search. In step S203, an offset value (black data) and a white reference value (white data) are obtained. It is determined in step S204 whether the resultant white reference data is irregular white data. If YES in step S204, each gain is corrected by equation (2) described above to detect an offset value and a white reference value again in step S205.

In step S206, the carriage 69 is moved to the position B. In step S207, a white reference value is detected. In step S208, the white reference value at the position A is compared with that at the position B, and a larger one of the white reference values is determined as a final white reference value.

In step S209, the carriage 69 is moved to the home position. In step S210, a temperature is obtained. A heat-keeping state is restored in step S211, and the process is ended.

Figure 27:
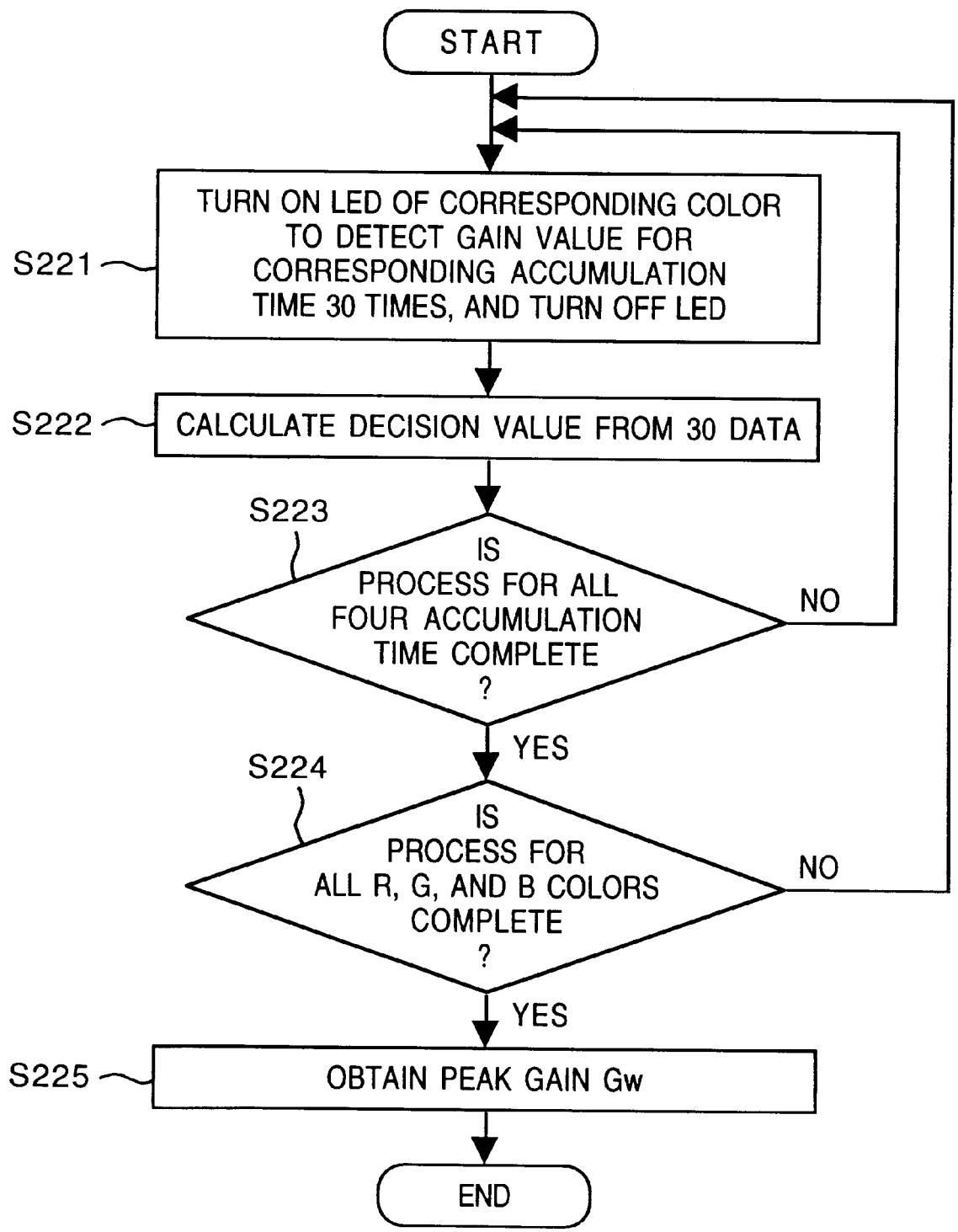
FIG. 27 is a flow chart showing a gain detection process.

FIG. 27 is a flow chart showing a gain detection process in step S202 in detail. In step S221, the LED of the corresponding color is turned on to detect a gain 30 times for the corresponding accumulation time. The LED is then turned off. In step S222, the 30 data are averaged to calculate a decision value. It is then determined in step S223 whether the process for all the four accumulation times is complete. Steps S221 and S222 are repeated for all the four accumulation times. It is then determined in step S224 whether the process for all the R, G, and B LEDs is complete. Steps S221 to S223 are repeated for all the R, G, and B LEDs. When all the operations are complete, a peak gain Gw is obtained by equation (1) in step S225, and the process is ended.

Figure 28:
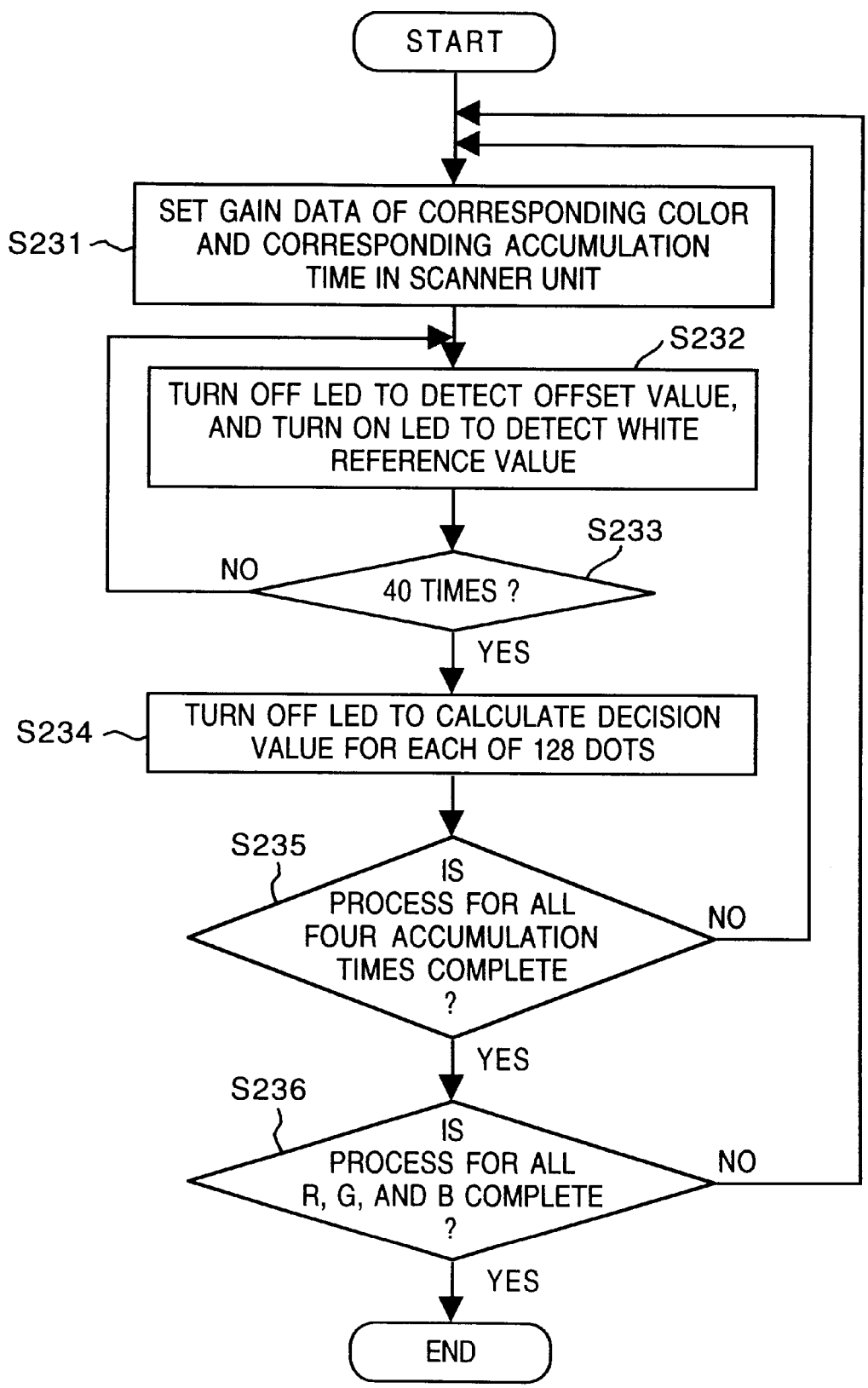
FIG. 28 is a flow chart showing an offset value and white reference value detection process.

FIG. 28 is a flow chart showing an offset value and white reference value detection process in step S203 in detail.

In step S231, gain data for the corresponding color and the corresponding accumulation time is set in the scanner unit 66. In step S232, the LED is turned off to detect an offset value. A white reference value corresponding to the offset value detected upon turn-on operation of the LED is detected. The process in step S232 is repeated 40 times in accordance with the decision step S233. The LED is then turned off in step S234, the offset values and the white reference values obtained from all the 128 pixels are averaged to calculate decision values.

The process in steps S231 to S234 is repeated for all the four accumulation times in accordance with the decision step S235. The process in steps S231 to S235 is repeated in accordance with the decision step S236 for all R, G, and B colors, and the process is ended.

Figure 29:
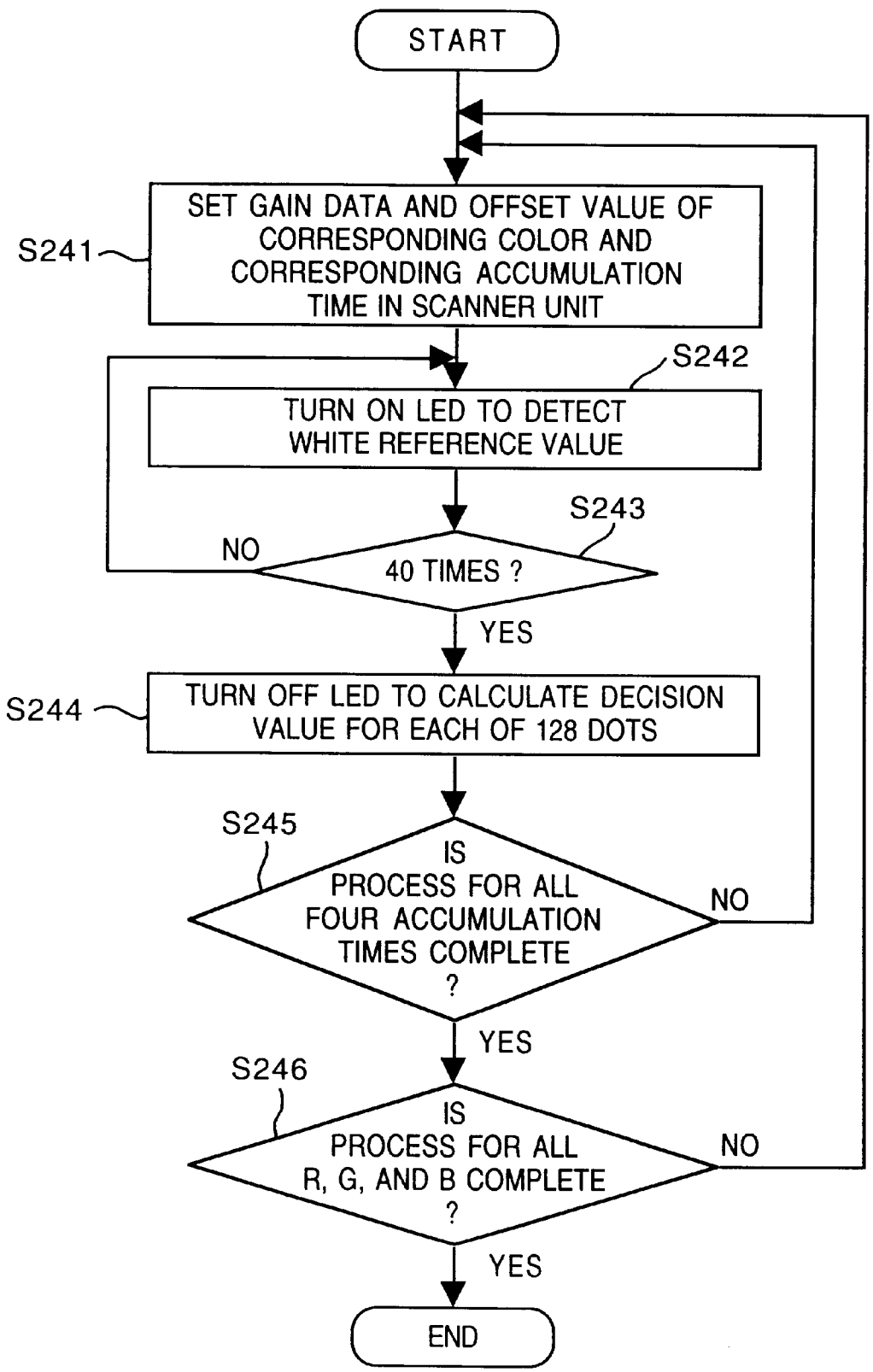
FIG. 29 is a flow chart showing a white reference value detection process.

FIG. 29 is a flow chart showing a white reference detection process in step S207 in detail.

Gain data and an offset value (black data) for the corresponding color and the corresponding accumulation time are set in the scanner unit 66 in step S241. In step S242, the LED is turned on to detect a white reference value. The process in step S242 is repeated 40 times in accordance with the decision step S243. The LED is then turned off in step S244. The white reference values obtained from the 128 pixels are averaged to calculate a decision value.

The process in steps S241 to S244 is repeated for the four accumulation times in accordance with the decision step S245. In addition, the process in steps S241 to S245 is repeated for all the R, G, and B colors in accordance with the decision step S246, and the process is ended.

Exchange of Scanner Unit and Print Head Unit

FIG. 30 is a flow chart showing a scanner unit and print head unit exchange process.

In step S251, a unit to be mounted on the carriage 69 is selected by the user. If the selected unit is the print head unit 67 in accordance with determination of the selected unit in step S252, setting items for the print head unit 67 are designated in step S253. However, if the selected unit is the scanner unit 66, it is determined in step S254 whether the unit is new.

Unit exchange is performed in step S255. The unit exchange is performed by issuing a unit exchange start command D000H to set a unit exchangeable state. When the exchange operation is complete, a unit exchange end command D001H is issued to complete the unit exchange.

After the unit exchange, when the scanner unit 66 is mounted, it is determined on the basis of the information designated in step S256 whether the mounted scanner unit 66 is new. If YES in step S256, the exchange to the new unit is recorded on the information file in step S257.

The unit exchange is thus complete.

White Reference Data Obtaining and Setting Processes

Figure 31:
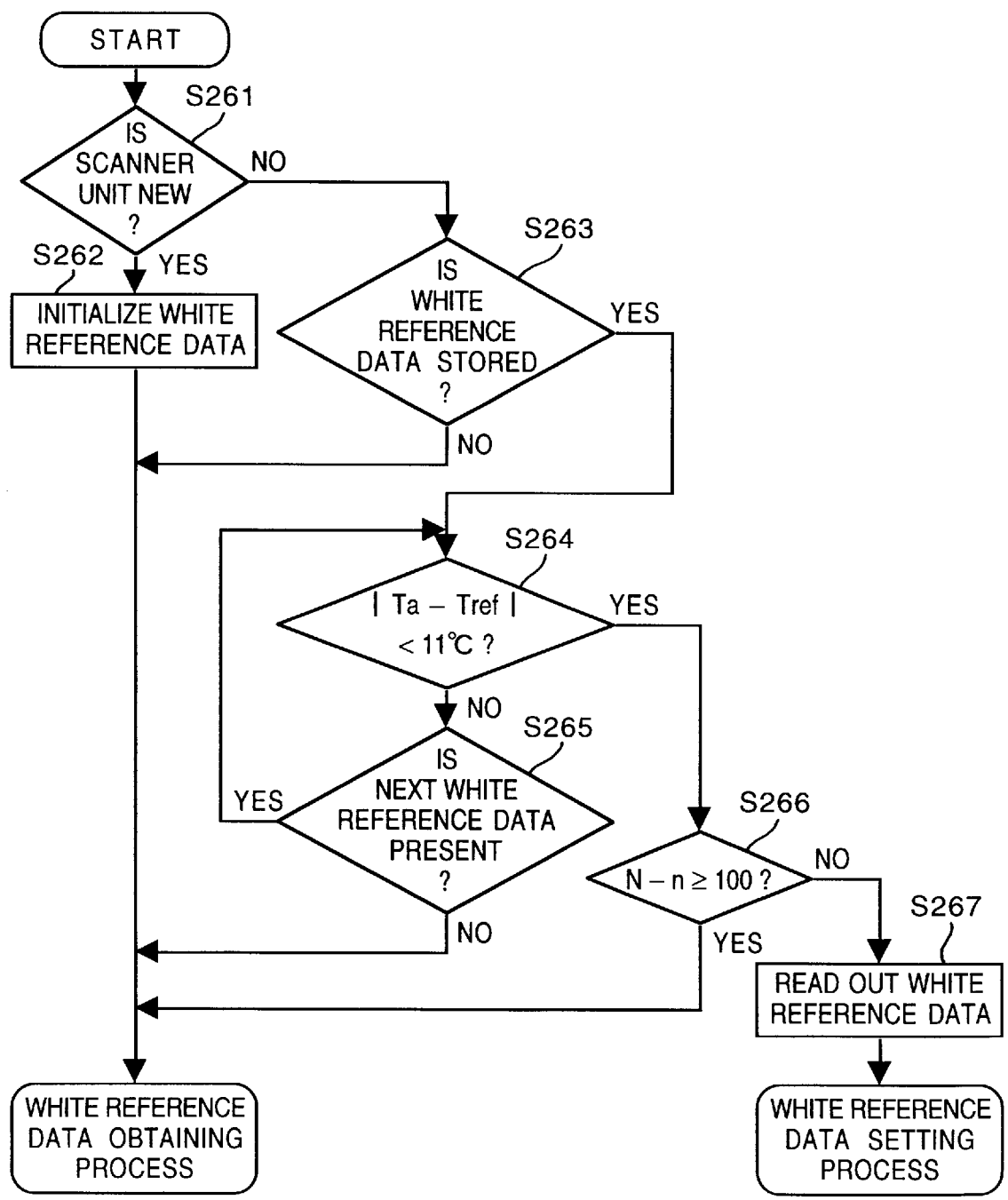
FIG. 31 is a flow chart showing a white reference data obtaining process.

FIG. 31 is a flow chart showing the white reference data obtaining process executed by the printer driver prior to an image read operation.

It is determined in step S261 on the basis of the information file whether the scanner unit 66 mounted on the carriage 69 is new. If YES in step S261, white reference data is initialized in step S262 to advance to a white reference data obtaining process. If NO in step S261, it is determined in step S263 whether white reference data is stored in the database. If NO in step S263, the flow advances to the white reference data obtaining process. If YES in step S263, the current ambient temperature Ta is compared with the ambient temperature Tref in obtaining this white reference data in step S264. If the difference between these two temperatures is 11° C. or more, it is determined in step S265 whether the next white reference data is present. That is, data having a temperature difference of less than 11° C. is searched from the latest white reference data. If no white reference data having the temperature difference of less than 11° C. is found, the white data obtaining process is started.

If the white reference data having the temperature difference of less than 11° C. is found, the current image read total count N is compared with the image read count n in obtaining this white reference data to determine whether the image read operation is performed 100 or more times from the obtaining timing of this white reference data. If so, the flow advances to the white reference data obtaining process; otherwise, white reference data is read out in step S267, and the flow advances to the white reference data setting process.

Figure 32:
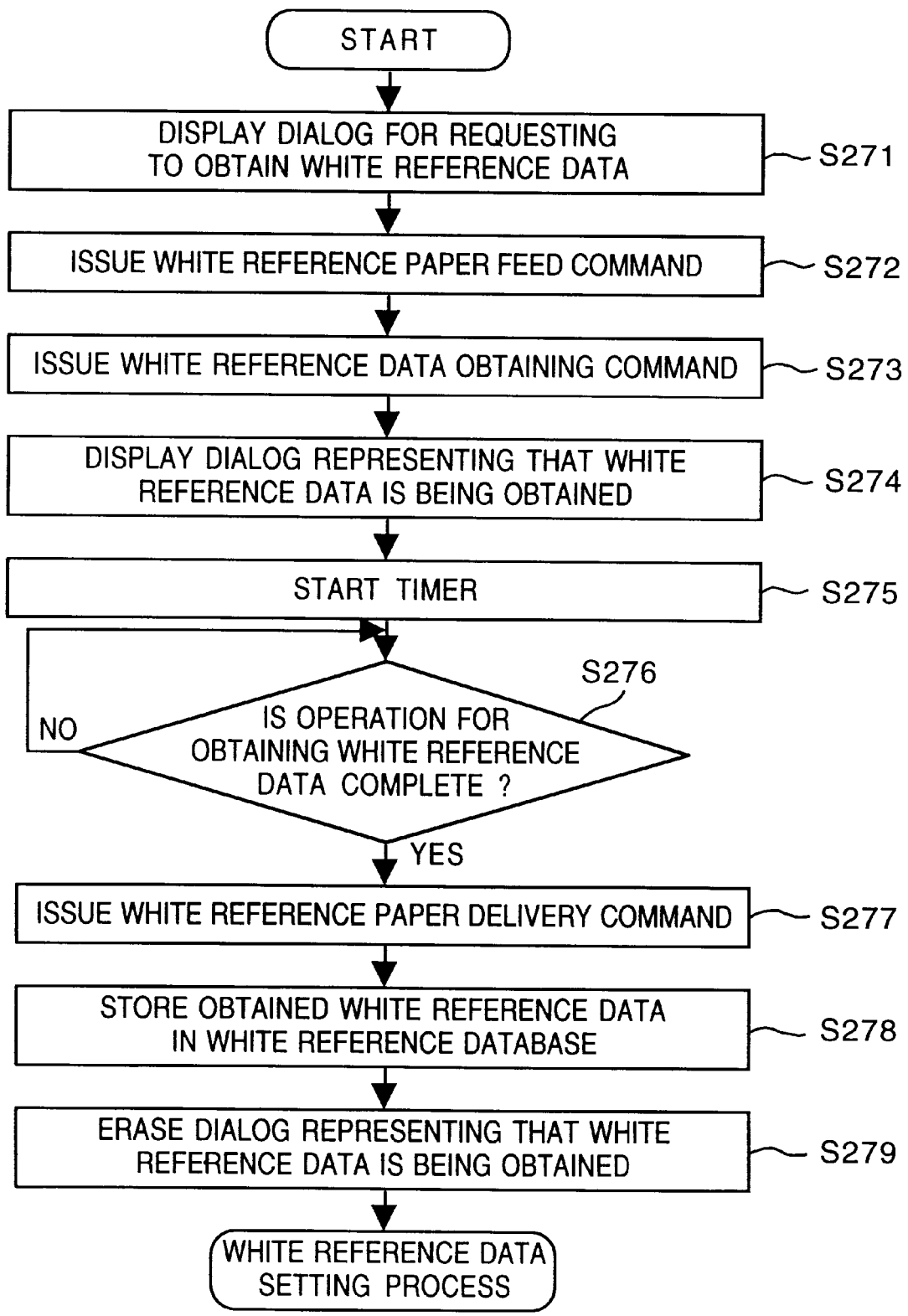
FIG. 32 is a flow chart showing a white data obtaining process.

FIG. 32 is a flow chart showing the white reference data obtaining process by the printer-driver.

In step S271, a dialog for requesting to obtain white reference data is displayed. In step S272, a paper feed command 9FF1H is issued to feed white reference paper.

When the white reference paper is fed, a white reference data obtaining command is issued in step S273. The white reference data obtaining command is determined based on the command string shown in FIG. 24. Upon reception of the white reference data obtaining command, the printer unit 200 performs the white reference data obtaining process in FIG. 26 to obtain white reference values respectively corresponding to the accumulation times.

Until the printer unit 200 returns the white reference data upon completion of the white reference data obtaining process, the dialog representing that the white reference data is being obtained is displayed in step S274. In step S275, a timer is started to obtain white reference data for, e.g., 100 sec. It is then determined in step S276 by the timer whether the white reference data obtaining process is complete.

When the white reference data obtaining operation is complete, a delivery command 9FF0H is issued in step S277 to deliver the white reference paper. In step S278, the white reference data received from the printer unit 200 is stored in the white reference database. In step S279, the dialog representing that the white reference data is being obtained is erased, and the flow advances to the white reference data setting process.

Figure 33:
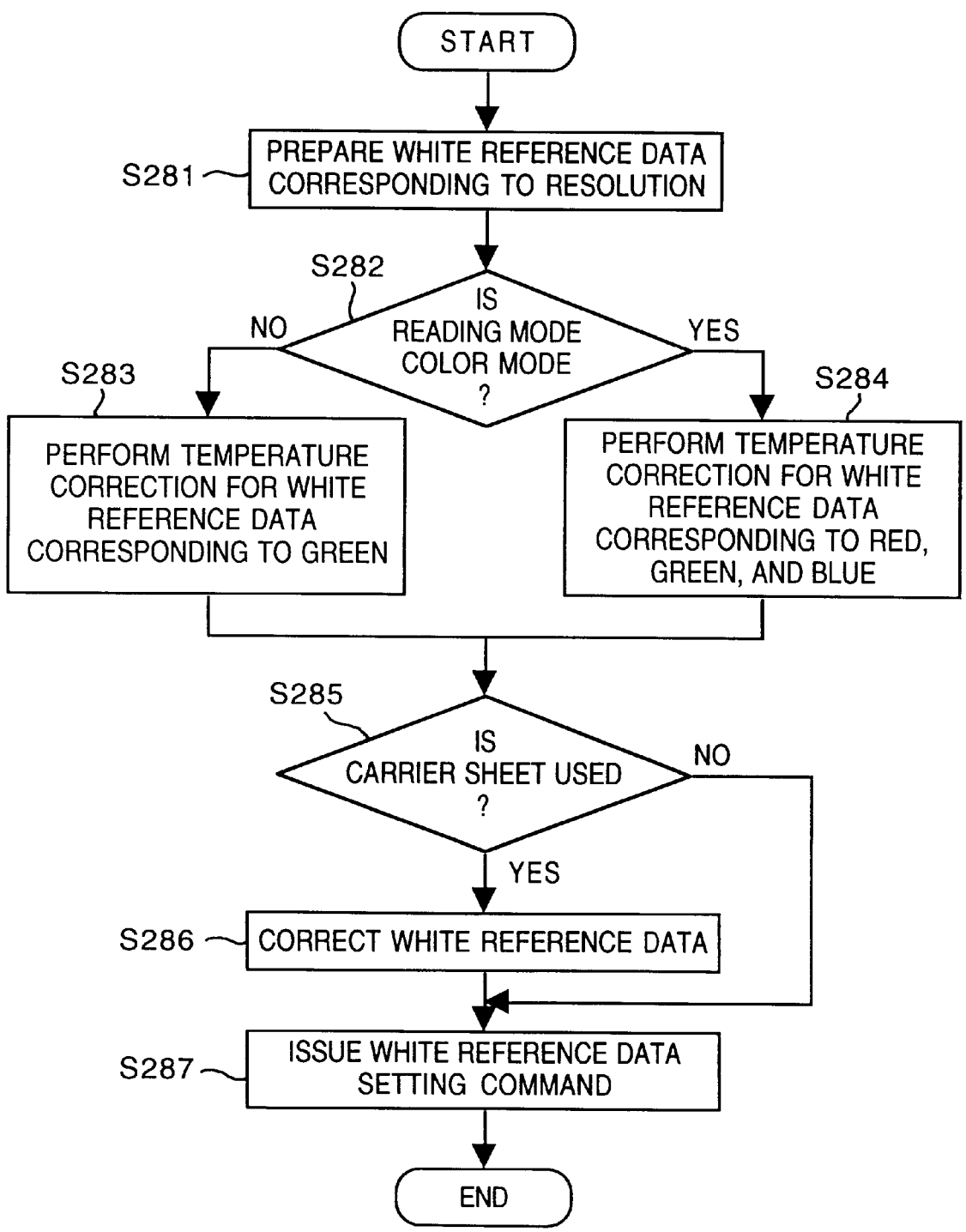
FIG. 33 is a flow chart showing a white reference data setting process.

FIG. 33 is a flow chart showing the white reference data setting process executed by the printer driver.

In step S281, white reference data having an accumulation time corresponding to one of the reading modes shown in FIGS. 12A to 12C is prepared. It is determined in step S282 whether the reading mode is a color mode or a monochrome mode. If the mode is determined as the monochrome mode, the white reference data corresponding to green is corrected on the basis of the temperature correction coefficient a in step S283. If the mode is determined as the color mode, the white reference data corresponding to red, green, and blue are corrected on the basis of the temperature correction coefficients a. It is then determined in step S285 whether use of the carrier sheet is designated. If YES in step S285, the prepared white reference data is multiplied with the correction value of 93% determined in consideration of the presence of the carrier sheet, thereby performing correction in step S286. A white reference data setting command is issued in step S287 using the white reference data thus prepared. The white reference data setting command is determined based on the corresponding accumulation time in the command string shown in FIG. 25. Upon reception of the white reference data setting command, the printer unit 200 sets the received white reference data in the scanner unit 66.

White reference value setting is thus complete.

As described above, according to this embodiment, the print head unit of the built-in printer is replaced with the scanner unit, and a high-quality image can be stably read. In addition, a high-quality image can be read regardless of changes in ambient temperature and reading mode.

Modification of the Embodiments

Methods (1) to (3) of setting white reference data in mounting the scanner unit 66 are available as follows.

(1) A circuit (not shown) for reading out serial numbers for specifying the respective units is arranged in the scanner unit 66. Upon exchange of a unit, the printer driver reads out the serial number of this unit and sets it in the information file.

The serial numbers of units in obtaining white reference data are also stored in the white reference database. In obtaining and setting white reference data, the serial number set in the information file is compared with the serial number stored in the white reference database. If these numbers coincide with each other, this white reference database is used; otherwise, the white reference database is initialized to obtain white reference data again.

(2) Identification numbers for specifying the respective units are set in the information file and the white reference database by the user in exchanging the scanner unit 66. In obtaining and setting the white reference data, if an identification number coinciding with the identification number set in the information file is stored, this white reference database is used; otherwise, a new white reference database is prepared.

(3) A white reference value is obtained in exchanging the scanner unit 66. The profile of this white reference value is compared with the profile of the white reference value stored in the white reference database. For example, the variance of the white reference values for dots is a predetermined value or less, the units subjected to the exchange are identical, and the profile of the obtained white reference value is stored in the white reference database; otherwise, a new white reference database is prepared. The white reference data base of the mounted scanner unit 66 is set in the information file. In obtaining and setting white reference data, the white reference database set in the information file is used.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment/embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment/embodiments are realized by executing the program codes which are read by a computer, the present invention includes a case where an OS (operating system) or the like working on the computer performs a part or entire processes in accordance with designations of the program codes and realizes functions according to the above embodiment/embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment/embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus for reading an image of original, said apparatus comprising:
    photoelectric conversion means for converting light from the original into an image signal;
    first correction means for correcting a white level of the image signal;
    storage means for storing white reference data for white level correction in correspondence with a reference temperature;
    detection means for detecting a temperature near said photoelectric conversion means; and
    second correction means for correcting the reference white data on the basis of a temperature difference between the temperature detected by said detection means and the reference temperature,
    wherein the white level is corrected by said first correction means using the white reference data corrected by said second correction means.

2. The apparatus according to claim 1, further comprising a light source for illuminating the original.

3. The apparatus according to claim 2, wherein said light source comprises a plurality of light sources having different colors.

4. The apparatus according to claim 2, wherein said light source is an LED.

5. The apparatus according to claim 3, further comprising control means for turning on said plurality of light sources in a predetermined order.

6. The apparatus according to claim 3, wherein a plurality of white reference data respectively corresponding to said plurality of light sources having the different colors are stored in said storage means.

7. The apparatus according to claim 1, wherein said photoelectric conversion means is a CCD line sensor.

8. The apparatus according to claim 2, wherein said light source, said photoelectric conversion means, and said first correction means are included in an image reading device detachable from said apparatus.

9. The apparatus according to claim 8, wherein said image reading device comprises sending means for sending the image signal to said apparatus.

10. The apparatus according to claim 8, wherein said image reading device comprises analog to digital conversion means for converting a signal read by said photoelectric conversion means into a digital signal.

11. The apparatus according to claim 8, wherein said image reading device comprises optical means for guiding light emitted from said light source to the original and guiding light reflected by the original to said photoelectric conversion means.

12. The apparatus according to claim 8, further comprising a carriage on which a print head unit for forming an image on a printing medium is detachably mounted,
    wherein said image reading device is detachably mounted on said carriage.

13. The apparatus according to claim 12, wherein said image reading device comprises sending means for sending the image signal to said apparatus through an interface for said print head unit.

14. An image reading device detachably attached to an image processing apparatus having storage means for storing white reference data for white level correction in correspondence with a reference temperature, detection means for detecting a temperature near said photoelectric conversion means, and first correction means for correcting the white reference data on the basis of a temperature difference between the temperature detected by said detection means and the reference temperature, said device comprising:
    photoelectric conversion means for converting light from the original into an image signal; and
    second correction means for correcting a white level of the image signal,
    wherein the white level is corrected by said second correction means using the white reference data corrected by said first correction means.

15. The device according to claim 14, further comprising a light source for illuminating the original.

16. The device according to claim 15, wherein said light source comprises a plurality of light sources having different colors.

17. The device according to claim 15, wherein said light source is an LED.

18. The device according to claim 14, further comprising control means for turning on said plurality of light sources in a predetermined order.

19. The device according to claim 14, further comprising analog to digital conversion means for converting a signal read by said photoelectric conversion means into a digital signal.

20. The device according to claim 14, further comprising optical means for guiding light emitted from said light source to the original and guiding light reflected by the original to said photoelectric conversion means.

21. The device according to claim 14, wherein said apparatus comprises a carriage on which a print head unit for forming an image on a printing medium is detachably mounted, and said image reading device is detachably mounted on said carriage.

22. The device according to claim 21, further comprising sending means for sending the image signal to said apparatus through an interface for said print head unit.

23. An image reading method for reading an image of original, said method comprising the steps of:
    converting light from the original into an image signal using photoelectric conversion means;
    correcting a white level of the image signal;
    detecting a temperature near said photoelectric conversion means; and
    correcting white reference data for white level correction stored in correspondence with a reference temperature, on the basis of a temperature difference between a detected temperature and the reference temperature,
    wherein the step of correcting the white level is performed using the corrected white reference data.

24. A computer program product comprising a computer readable medium having computer code, for reading an image of original by using an image reading device having photoelectric conversion means for converting light from the original into an image signal and correction means for correcting a white level of the image signal, said product comprising:

detecting process procedure codes for detecting a temperature near said photoelectric conversion means;

correcting process procedure codes for correcting white reference data for white level correction stored in correspondence with a reference temperature, on the basis of a temperature difference between the detected temperature and the reference temperature; and controlling process procedure codes for controlling correction process of said correcting means so as to use the corrected white reference data.

25. An image processing apparatus having a carriage on which an image reading device for reading an image of original is detachably mounted, said apparatus comprising:

detection means for detecting an ambient temperature near said carriage;

storage means for storing white reference data representing a white reference from said image reading device in association with an ambient temperature in obtaining the white reference data; and obtaining means for obtaining white reference data of an image reading device mounted on said carriage;

setting means for reading out white reference data similar to the white reference data obtained by said obtaining means from said storage means and setting the readout white reference data in said image reading device mounted on said carriage.

26. The apparatus according to claim 25, wherein said carriage on which a print head unit for forming an image on a printing medium is detachabley mounted.

27. The apparatus according to claim 25, wherein said setting means determines the similar white reference data on the basis of variance of the obtained white reference data.

28. The apparatus according to claim 25, wherein said setting means stores obtained white reference data when the similar white reference data is not stored in said storage means.

29. An image reading method for an image processing apparatus having a carriage on which an image reading device for reading an image of original is detachably mounted, said method comprising the steps of:

detecting an ambient temperature near said carriage;

obtaining white reference data of an image reading device mounted on said carriage;

reading out white reference data similar to the similar white reference data information obtained in the obtaining step from storage means which stores white reference data representing a white reference from said image reading device in association with an ambient temperature in obtaining the white reference data; and setting the readout white reference data in said image reading device mounted on said carriage.

30. A computer program product comprising a computer readable medium having computer program code, for reading an image of original by using an image processing apparatus having a carriage on which an image reading device for reading an image of original is detachably mounted, said product comprising:

detecting process procedure codes for detecting an ambient temperature near said carriage;

obtaining process procedure codes for obtaining white reference data of an image reading device mounted on said carriage;

reading process procedure codes for reading out white reference data similar to the similar white reference data information obtained in the obtaining process from storage means which stores white reference data representing a white reference from said image, reading device in association with an ambient temperature in obtaining the white reference data; and setting process procedure codes for setting the readout white reference data in said image reading device mounted on said carriage.

31. An image processing apparatus having a carriage on which an image reading device for reading an image of original is detachably mounted, said apparatus comprising:

detection means for detecting an ambient temperature near said carriage;

storage means for storing white reference data representing a white reference from said image reading device on the basis of a plurality of image reading conditions, in association with each image reading condition and an ambient temperature in obtaining the white reference data; and setting means for reading out white reference data associated with an image reading condition set by a user from said storage means and setting the readout white reference data in said image reading device mounted on said carriage.

32. The apparatus according to claim 31, wherein said carriage on which a print head unit for forming an image on a printing medium is detachably mounted.

33. The apparatus according to claim 31, wherein the image reading conditions include an image reading mode representing an attribute of image data obtained by said image reading device, and said setting means sets in said image reading device white reference data having a characteristic corresponding to the image reading mode.

34. The apparatus according to claim 33, wherein the attribute of the image data includes at least one of a color/monochrome, a resolution, and a bit depth.

35. The apparatus according to claim 33, wherein the characteristic corresponding to the data reading mode includes a charge accumulation time of a charge-coupled device.

36. An image reading method for an image processing apparatus having a carriage on which an image reading device for reading an image of original is detachably mounted, said method comprising the steps of:

detecting an ambient temperature near said carriage;

reading out white reference data associated with an image reading condition set by a user from storage means which stores white reference data representing a white reference from said image reading device on the basis of a plurality of image reading conditions, in association with each image reading condition and an ambient temperature in obtaining the white reference data;

setting the readout white reference data in said image reading device mounted on said carriage.

37. A computer program product comprising a computer readable medium having computer program code, for reading an image of original by using an image processing apparatus having a carriage on which an image reading device for reading an image of original is detachably mounted, said product comprising:

detecting process procedure codes for detecting an ambient temperature near said carriage;

reading process procedure codes for reading out white reference data associated with an image reading condition set by a user from storage means which stores white reference data representing a white reference from said image reading device on the basis of a plurality of image reading conditions, in association with each image reading condition and an ambient temperature in obtaining the white reference data;

setting process procedure codes for setting the readout white reference data in said image reading device mounted on said carriage.

* * * * *

UNITED STATES PATENT AND TRADEMARK OFFICE
CERTIFICATE OF CORRECTION

PATENT NO. : 6,191,873 B1
DATED : February 20, 2001
INVENTOR(S) : Shigeru Mizoguchi et al.

It is certified that error appears in the above-identified patent and that said Letters Patent is hereby corrected as shown below:

<u>Title page,</u>
Item [75], the addresses for the Inventors should read as follows:

--       Shigeru Mizoguchi, Kanagawa-ken, Japan;
         Koji Fukunaga, Tokyo, Japan;
         Kenji Maeda, Kanagawa-ken, Japan;
         Kiyoshi Katano, Chiba-ken, Japan;
         Takahiro Onsen, Kanagawa-ken, Japan;
         Makoto Kobayashi, Kanagawa-ken, Japan;
         Jin Sunata, Kanagawa-ken, Japan                    --

Signed and Sealed this

Second Day of July, 2002

Attest:

JAMES E. ROGAN
Attesting Officer       *Director of the United States Patent and Trademark Office*